US012771980B2

(12) United States Patent
Xie et al.

(10) Patent No.: US 12,771,980 B2
(45) Date of Patent: Oct. 20, 2026

(54) WIRELESS HEADSET AND AUDIO DEVICE

(71) Applicant: Huawei Technologies Co., Ltd., Shenzhen (CN)

(72) Inventors: Zichen Xie, Shanghai (CN); Zhan Guo, Shanghai (CN); Weihua Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 486 days.

(21) Appl. No.: 18/344,206

(22) Filed: Jun. 29, 2023

(65) Prior Publication Data

US 2023/0353920 A1 Nov. 2, 2023

Related U.S. Application Data

(63) Continuation of application No. PCT/CN2020/142463, filed on Dec. 31, 2020.

(51) Int. Cl.
*H04R 1/10* (2026.01)

(52) U.S. Cl.
CPC .......... *H04R 1/10* (2013.01); *H04R 2420/07* (2013.01)

(58) Field of Classification Search
CPC . H04R 1/10; H04R 1/005; H04R 1/02; H04R 2420/07; H04R 5/033; H04R 5/00; H04R 25/552; H04S 1/005
USPC ........................ 381/1, 309, 311, 74, 23.1, 26
See application file for complete search history.

(56) References Cited

U.S. PATENT DOCUMENTS

2020/0053460 A1* 2/2020 Pedersen ............. G06F 12/0815
2020/0396028 A1 12/2020 Haartsen et al.
2022/0319553 A1* 10/2022 Cheong ................ G11B 27/031

FOREIGN PATENT DOCUMENTS

CN 110177313 A 8/2019
CN 111586655 A * 8/2020 .......... H04M 1/7243
CN 111970626 A 11/2020
WO 2020113588 A1 6/2020

* cited by examiner

*Primary Examiner* — Ahmad F. Matar
*Assistant Examiner* — Sabrina Diaz
(74) *Attorney, Agent, or Firm* — Slater Matsil, LLP

(57) ABSTRACT

This application provides a wireless headset, an audio device, and a system. The wireless headset includes: a first headset, including: a first microphone, configured to obtain, through voice capturing, first audio data corresponding to a first channel; a first encoder, configured to encode the first audio data to obtain a first audio packet; and a first wireless transceiver, configured to transmit the first audio packet to an audio device over a first communication connection; and a second headset, including: a second microphone, configured to obtain, through voice capturing, second audio data corresponding to a second channel; a second encoder, configured to encode the second audio data to obtain a second audio packet; and a second wireless transceiver, configured to transmit the second audio packet to the audio device over a second communication connection. This implementation can improve performance of the wireless headset.

18 Claims, 11 Drawing Sheets

400

800

WIRELESS HEADSET AND AUDIO DEVICE

CROSS-REFERENCE TO RELATED APPLICATIONS

This application is a continuation of International Application No. PCT/CN2020/142463, filed on Dec. 31, 2020, the disclosure of which is hereby incorporated by reference in its entirety.

TECHNICAL FIELD

This application relates to the field of a short range communication technology, and more specifically, to a wireless headset and an audio device.

BACKGROUND

With the development of wireless communication technologies and audio processing technologies, more users prefer to use wireless headsets for audio playing due to advantages such as portability and convenience of the wireless headsets. To improve the audio playing effect and provide audiences with an immersive feeling, for example, to truly restore the recorded sound source and create a stereo sound to make audiences feel like in a real sound scene, Binaural audio, “binaural recording technology” for brief, was proposed. The binaural recording technology aims to separately capture sounds near a left ear and a right ear of a person, and process the captured sounds near the left ear and the right ear, to simulate acoustic effect of listening with human ears.

In a binaural recording technology currently applied to a wireless headset, the captured left-ear audio data and the captured right-ear audio data usually need to be packaged and then transmitted to a processing device via an air interface of one of the headsets. Because a signal transmission capability of an air interface of the headset is limited, the captured audio data needs to be compressed. In this way, sound quality of the recorded audio data is reduced. In addition, as one of the wireless headsets is used for an audio data transmission, power consumption of the headset for the audio data transmission is excessively high. As a result, power consumption of the left and right headsets is unbalanced, and a battery life capability of the headset device is reduced. Therefore, in a binaural recording scenario, how to improve performance of a wireless headset becomes a problem that needs to be resolved.

SUMMARY

A wireless headset and an audio device provided in this application can improve performance of the wireless headset.

According to a first aspect, this application provides a wireless headset. The wireless headset includes: a first headset, including: a first microphone, configured to obtain, through voice capturing, first audio data corresponding to a first channel; a first encoder, configured to encode the first audio data to obtain a first audio packet; and a first wireless transceiver, configured to transmit the first audio packet to an audio device over a first communication connection; and a second headset, including: a second microphone, configured to obtain, through voice capturing, second audio data corresponding to a second channel; a second encoder, configured to encode the second audio data to obtain a second audio packet; and a second wireless transceiver, configured to transmit the second audio packet to the audio device over a second communication connection. The first communication connection is different from the second communication connection. The first channel and the second channel are used to implement stereo sound effect.

It should be noted that, the first communication connection being different from the second communication connection means that data transmission paths are different. That is, the first headset and the second headset respectively perform a data transmission with the audio device.

The wireless headsets herein can be true wireless stereo headsets or other types of wireless headsets.

The first headset and the second headset in the wireless headset described in this application may respectively establish a connection with the audio device, and may respectively perform a data transmission with the audio device independently. Therefore, the first headset and the second headset in the wireless headset are decoupled. Data captured by one of the headset does not need to be transmitted to the audio device through the other headset. In this way, power consumption of two headsets in the wireless headset is balanced. In addition, both of the two headsets in the wireless headset can encode audio data and transmit the encoded audio data to the audio device. Therefore, compared with using one headset to communicate with the audio device, a transmission amount of audio data in a transmission cycle can be increased, thereby reducing a compression amount of audio data, and improving audio quality. Further, one of headsets does not need to transmit the obtained audio data to the other headset. Therefore, for a real-time audio processing scenario, a delay of data transmission between the headset and the audio device can be reduced, which helps improve user experience.

Based on the first aspect, in a possible implementation, the first wireless transceiver is further configured to: receive first indication information from the audio device, and determine, based on the first indication information, a first communication period used by the first wireless transceiver to transmit the first audio packet in a communication cycle. The second wireless transceiver is further configured to: receive second indication information from the audio device, and determine, based on the second indication information, a second communication period used by the second wireless transceiver to transmit the second audio packet in the communication cycle.

In a first possible implementation, the first communication period and the second communication period are time division periods in the communication cycle. In this case, the audio device configured to communicate with the first wireless transceiver and the second wireless transceiver may be provided with one antenna, or may be provided with a plurality of antennas. The first communication period and the second communication period are set as time-division periods, so that the first wireless transceiver and the second wireless transceiver may alternately transmit the first audio packet and the second audio packet to the audio device in the communication cycle. In a specific implementation, the first communication period and the second communication period may be set as closely adjacent communication periods on a time axis. For example, one communication cycle is 400 μs, that is, four 100 μs are included. A first 100 μs is the first communication period, a second 100 μs is the second communication period, a third 100 μs is the first communication period, and a fourth 100 μs is the second communication period. The first communication period and the second communication period are set as closely adjacent communication periods on the time axis, so that data transmission efficiency can be improved, and a communication delay can be reduced.

In a second possible implementation, the first communication period and the second communication period are same time periods in the communication cycle. In this implementation, the audio device that communicates with the first wireless transceiver and the second wireless transceiver may be provided with a plurality of antennas. A first antenna of the plurality of antennas is configured to receive the first audio packet from the first wireless transceiver, and a second antenna of the plurality of antennas is configured to receive the second audio packet from the second wireless transceiver.

It should be noted that, after the first wireless transceiver transmits the first audio packet to the audio device in the first communication period, the first wireless transceiver may further receive, from the audio device, indication information indicating whether the first audio packet is successfully transmitted. After the second wireless transceiver transmits the second audio packet to the audio device in the second communication period, the second wireless transceiver may further receive, from the audio device, indication information indicating whether the second audio packet is successfully transmitted.

Based on the first aspect, in a possible implementation, the first communication period includes: at least one first communication sub-period and at least one second communication sub-period. The at least one first communication sub-period is used to transmit the first audio packet to the audio device, and the at least one second communication sub-period is used to retransmit the first audio packet to the audio device when the first audio packet is unsuccessfully transmitted. An example in which one communication cycle is 400 μs, that is, four 100 μs are included, is used for description. When the first communication period and the second communication period are time division periods in the communication cycle, the first 100 μs is the first communication sub-period, and the third 100 μs is the second communication sub-period. In this case, the first wireless transceiver transmits the first audio packet at the first 100 μs. In addition, within the first 100 μs, the first wireless transceiver may further receive, from the audio device, indication information indicating whether the first audio packet is successfully transmitted. When determining that the first audio packet is unsuccessfully transmitted, the first wireless transceiver retransmits the first audio packet to the audio device at the third 100 μs. When the first communication period and the second communication period are the same periods in the communication cycle, the first 100 μs is the first communication sub-period, and the second 100 μs is the second communication sub-period. In this case, the first wireless transceiver transmits the first audio packet at the first 100 μs. In addition, within the first 100 μs, the first wireless transceiver may further receive, from the audio device, indication information indicating whether the first audio packet is successfully transmitted. When determining that the first audio packet is unsuccessfully transmitted, the first wireless transceiver retransmits the first audio packet to the audio device at the second 100 μs.

Based on the first aspect, in a possible implementation, the second communication period includes: at least one third communication sub-period and at least one fourth communication sub-period. The at least one third communication sub-period is used to transmit the second audio packet to the audio device, and the at least one fourth communication sub-period is used to retransmit the second audio packet to the audio device when the third audio packet is unsuccessfully transmitted. Specific implementation is the same as that of the first communication sub-period and the second communication sub-period. For detailed description, refer to related descriptions of the first communication sub-period and the second communication sub-period. Details are not described herein again.

Based on the first aspect, in a possible implementation, the first headset further includes: a first decoder and a first speaker, and the second headset further includes a second decoder and a second speaker; the first wireless transceiver is further configured to: receive the third audio packet from the audio device, where the third audio packet is generated after the audio device performs audio data processing on the first audio data in the first audio packet; the first decoder is configured to decode the third audio packet to obtain third audio data; the first speaker is configured to perform playing based on the third audio data; the second wireless transceiver is further configured to: receive a fourth audio packet from the audio device, where the fourth audio packet is generated after the audio device performs audio data processing on the second audio data in the second audio packet; the second decoder is configured to decode the fourth audio packet to obtain fourth audio data; and the second speaker is configured to perform playing based on the fourth audio data.

Based on the first aspect, in a possible implementation, the first decoder is further configured to: decode the third audio packet to obtain third indication information, determine a first start time based on the third indication information, and control the first speaker to perform playing at the first start time based on the third audio data. The second decoder is further configured to: decode the fourth audio packet to obtain fourth indication information, determine a second start time based on the fourth indication information, and control the second speaker to perform playing at the second start time based on the fourth audio data.

Based on the first aspect, in a possible implementation, the first audio packet further includes fifth indication information, and the second audio packet further includes sixth indication information. The fifth indication information and the sixth indication information indicate the audio device to perform synchronous audio data processing on the first audio data and the second audio data that are captured at a same time.

Because communication between the first headset and the audio device and communication between the second headset and the audio device are independent of each other, neither the first headset nor the second headset can learn of various information of each other, for example, information about a time at which the audio data is captured, information about a time at which the audio data starts to be played, or the like. Therefore, the first audio packet further includes fifth indication information indicating the capturing time of the first audio data, and the second audio packet further includes sixth indication information indicating the capturing time of the second audio data. Therefore, the audio device performs, based on the fifth indication information and the sixth indication information, synchronous audio data processing on the first audio data and the second audio data that are captured at the same time. In this way, audio data processing effect being reduced for some first audio data and second audio data that are captured at the same time due to processed differently (for example, treble processing needs to be performed simultaneously on the first audio data and the second audio data that are captured at the same time. Because the capturing time of the first audio data and that of the second audio data is not synchronized, the audio device performs treble processing on the first audio data while performing bass processing on the second audio data that are captured at the same time) can be avoided, so that audio data processing effect is improved.

In addition, after the audio device processes the first audio data and the second audio data, the third audio packet and the fourth audio packet that are generated include the third indication information and the fourth indication information respectively. The third indication information and the fourth indication information are set, so that the first headset and the second headset can perform synchronous audio playing, thereby improving audio playing effect.

Based on the first aspect, in a possible implementation, the audio data processing includes at least one of: noise reduction, amplification, pitch conversion, or stereo synthesis.

Based on the first aspect, in a possible implementation, the first encoder is configured to encode the first audio data based on a frame format in a communication protocol, to obtain the first audio packet. The second encoder is configured to encode the second audio data based on the frame format, to obtain the second audio packet. The frame format includes at least one of a clock field, a clock offset field, an audio packet length field, and an audio data field, and the clock field and the clock offset field indicate an audio data capturing time.

Based on the first aspect, in a possible implementation, before transmitting the first audio packet to the audio device, the first wireless transceiver is further configured to establish the first communication connection with the audio device, and perform clock calibration with the audio device over the first communication connection. Before transmitting the second audio packet to the audio device, the second wireless transceiver is further configured to establish the second communication connection with the audio device, and perform clock calibration with the audio device over the second communication connection.

Time calibration performed between the first wireless transceiver and the second wireless transceiver with the audio device help improve accuracy of time synchronization between the first wireless transceiver and the second wireless transceiver with the audio device. Therefore, the audio device can more accurately determine first audio data and second audio data that are captured at a same time. In this way, accuracy of performing audio data processing on audio data by the audio device is improved. In addition, the first headset and the second headset may further determine playing time of the third audio data and the fourth audio data more accurately, which helps improve sound quality effect of audio playing.

Based on the first aspect, in a possible implementation, the first wireless transceiver and the second wireless transceiver communicate with the audio device based on a short range communication technology.

The short range communication technology may include but are not limited to, a Bluetooth communication technology, a Wi-Fi communication technology, or the like.

According to a second aspect, an embodiment of this application provides a headset apparatus, used in any headset in a wireless headset, where the wireless headset includes a first headset and a second headset, and the first headset and the second headset are configured to capture audio data of different channels respectively, and communicate with an audio device over different communication connections. The headset apparatus includes: an encoder, configured to obtain first audio data from a microphone, and encode the first audio data to obtain a first audio packet, where the first audio data is audio data corresponding to a first channel; and a wireless transceiver, coupled to the encoder, and configured to establish a first communication connection with the audio device and transmit the first audio packet to the audio device over the first communication connection.

The headset apparatus may be an integrated circuit or a chip. When the headset apparatus is a chip, the chip may include one or more chips. The wireless headset may include a plurality of independent headset apparatuses. For example, when the headset apparatus is disposed in a pair of wireless headsets, the wireless headsets may include two independent headset apparatuses. One of the headset apparatuses is configured to implement the communication between the first headset (for example, the left headset) and the audio device. The other headset apparatus is configured to implement the communication between the second headset (for example, the right headset) and the audio device.

Based on the second aspect, in a possible implementation, the wireless transceiver is further configured to receive first indication information from the audio device, and determine, based on the first indication information, a communication period used by the wireless transceiver to transmit the first audio packet in a communication cycle.

Based on the second aspect, in a possible implementation, the communication period includes at least one first communication sub-period and at least one second communication sub-period, where the at least one first communication sub-period is used to transmit the first audio packet to the audio device; and the at least one second communication sub-period is used to retransmit the first audio packet to the audio device when the first audio packet is unsuccessfully transmitted.

Based on the second aspect, in a possible implementation, the headset apparatus further includes: a decoder; the wireless transceiver is further configured to: receive a second audio packet from the audio device, where the second audio packet is generated after the audio device performs audio data processing on the first audio data in the first audio packet; and the decoder is configured to decode the second audio packet to obtain second audio data.

Based on the second aspect, in a possible implementation, the decoder is further configured to decode the second audio packet to obtain second indication information, determine a start time based on the second indication information, and control a speaker to perform playing at the start time based on the second audio data.

Based on the second aspect, in a possible implementation, the encoder is configured to encode the first audio data based on a frame format in a communication protocol, to obtain the first audio packet. The frame format includes at least one of a clock field, a clock offset field, an audio packet length field, and an audio data field, and the clock field and the clock offset field indicate an audio data capturing time.

Based on the second aspect, in a possible implementation, the wireless transceiver communicates with the audio device based on a short range communication technology.

According to a third aspect, this application provides an audio device, where the audio device includes: a wireless transceiver, configured to receive a first audio packet from a first headset in a wireless headset over a first communication connection, and receive a second audio packet from a second headset in the wireless headset over a second communication connection; and an audio processor, configured to decode the first audio packet to obtain first audio data, decode the second audio packet to obtain second audio data, and perform audio data processing on the first audio data and the second audio data to generate third audio data and fourth audio data respectively, where the first communication connection is different from the second communication connection.

It should be noted that, the first communication connection being different from the second communication connection means that data transmission paths are different. That is, the first headset and the second headset respectively perform a data transmission with the audio device.

Based on the third aspect, in a possible implementation, the wireless transceiver is further configured to transmit first indication information to the first headset, and transmit second indication information to the second headset, where the first indication information is for indicating a first communication period in which the first headset transmits the first audio packet in a communication cycle; and the second indication information is for indicating a second communication period in which the second headset transmits the second audio packet in the communication cycle.

Based on the third aspect, in a possible implementation, the first communication period and the second communication period are time division periods in the communication cycle.

Based on the third aspect, in a possible implementation, the audio device includes a plurality of transceiver antennas. The first communication period and the second communication period are same time periods in the communication cycle.

Based on the third aspect, in a possible implementation, the first communication period includes at least one first communication sub-period and at least one second communication sub-period. The first communication sub-period is used to receive the first audio packet from the first headset, and the second communication sub-period is used to re-receive the first audio packet from the first headset when the first audio packet is unsuccessfully received.

Based on the third aspect, in a possible implementation, the second communication period includes at least one third communication sub-period and at least one fourth communication sub-period. The third communication sub-period is used to receive the second audio packet from the second headset, and the fourth communication sub-period is used to re-receive the second audio packet from the second headset when the second audio packet is unsuccessfully received.

Based on the third aspect, in a possible implementation, the audio processor is further configured to: encode the third audio data and third indication information to generate a third audio packet, where the third indication information is for indicating a first start time at which the first headset performs playing based on the third audio data; and encode the fourth audio data and fourth indication information to generate a fourth audio packet, where the fourth indication information is for indicating a second start time at which the second headset performs playing based on the fourth audio data.

Based on the third aspect, in a possible implementation, the wireless transceiver is further configured to: transmit the third audio packet to the first headset over the first communication connection; and transmit the fourth audio packet to the second headset over the second communication connection.

Based on the third aspect, in a possible implementation, the audio processor is configured to: decode the first audio packet to obtain fifth indication information; decode the second audio packet to obtain sixth indication information; and perform, based on the fifth indication information and the sixth indication information, synchronous audio data processing on the first audio data and the second audio data that are captured at a same time, to generate the third audio data and the fourth audio data.

Based on the third aspect, in a possible implementation, the audio data processing includes at least one of: noise reduction, amplification, pitch conversion, or stereo synthesis.

Based on the third aspect, in a possible implementation, the audio processor is configured to: encode the third audio data and the third indication information, based on a frame format in a communication protocol, to generate the third audio packet, and encode the fourth audio data and the fourth indication information to generate the fourth audio packet. The frame format includes at least one of a clock field, a clock offset field, an audio packet length field, and an audio data field, and the clock field and the clock offset field indicate a time at which the audio data starts to be played.

Based on the third aspect, in a possible implementation, the audio processor is further configured to: before receiving the first audio packet from the first headset, establish the first communication connection with the first headset, and perform clock calibration with the first headset over the first communication connection; and before receiving the second audio packet from the second headset, establish the second communication connection with the second headset, and perform clock calibration with the second headset over the second communication connection.

Based on the third aspect, in a possible implementation, the audio device communicates with the first headset and the second headset based on a short range communication technology.

According to a fourth aspect, this application provides an audio system, where the audio system includes: the wireless headset according to the first aspect, and the audio device according to the third aspect.

According to a fifth aspect, this application provides a wireless headset communication method, where the communication method includes: First audio data corresponding to a first channel and second audio data corresponding to a second channel are obtained through voice capturing. The first audio data and the second audio data are respectively encoded to generate a first audio packet and a second audio packet. The first audio packet is transmitted to an audio device over a first communication connection with the audio device. The second audio packet is transmitted to the audio device over a second communication connection with the audio device. The first communication connection is different from the second communication connection, and the first channel and the second channel are used to implement stereo sound effect.

Based on the fifth aspect, in a possible implementation, the communication method further includes: First indication information is received from the audio device. Based on the first indication information, a first communication period used by the first wireless transceiver to transmit the first audio packet in a communication cycle is determined. Second indication information is received from the audio device. Based on the second indication information, a second communication period used by the second wireless transceiver to transmit the second audio packet in the communication cycle is determined.

Based on the fifth aspect, in a possible implementation, the first communication period and the second communication period are time division periods in the communication cycle.

Based on the fifth aspect, in a possible implementation, the first communication period and the second communication period are same time periods in the communication cycle.

Based on the fifth aspect, in a possible implementation, the first communication period includes at least one first communication sub-period and at least one second communication sub-period. The at least one first communication sub-period is used to transmit the first audio packet to the audio device, and the at least one second communication sub-period is used to retransmit the first audio packet to the audio device when the first audio packet is unsuccessfully transmitted.

Based on the fifth aspect, in a possible implementation, the second communication period includes at least one third communication sub-period and at least one fourth communication sub-period. The third communication sub-period is used to transmit the second audio packet to the audio device, and the fourth communication sub-period is used to retransmit the second audio packet to the audio device when the third audio packet is unsuccessfully transmitted.

Based on the fifth aspect, in a possible implementation, the communication method further includes: The third audio packet is received from the audio device, where the third audio packet is generated after the audio device performs audio data processing on the first audio data in the first audio packet. The third audio packet is decoded to obtain third audio data. Playing is performed based on the third audio data. A fourth audio packet is received from the audio device, where the fourth audio packet is generated after the audio device performs audio data processing on the second audio data in the second audio packet. The fourth audio packet is decoded to obtain fourth audio data. Playing is performed based on the fourth audio data.

Based on the fifth aspect, in a possible implementation, the decoding the third audio packet to obtain third audio data, and performing playing based on the third audio data includes: The third audio packet is decoded to obtain third indication information. A first start time is determined based on the third indication information. Playing is performed at the first start time based on the third audio data. The decoding the fourth audio packet to obtain fourth audio data, and performing playing based on the fourth audio data includes: The fourth audio packet is decoded to obtain fourth indication information. A second start time is determined based on the fourth indication information. Playing is performed at the second start time based on the fourth audio data.

Based on the fifth aspect, in a possible implementation, the first audio packet further includes fifth indication information, and the second audio packet further includes sixth indication information. The fifth indication information and the sixth indication information indicate the audio device to perform synchronous audio data processing on the first audio data and the second audio data that are captured at a same time.

Based on the fifth aspect, in a possible implementation, the audio data processing includes at least one of: noise reduction, amplification, pitch conversion, or stereo synthesis.

Based on the fifth aspect, in a possible implementation, the encoding the first audio data and the second audio data respectively to generate a first audio packet and a second audio packet includes: Based on a frame format in a communication protocol, the first audio data is encoded to obtain the first audio packet, and the second audio data is encoded to obtain the second audio packet. The frame format includes a clock field, a clock offset field, an audio packet length field, and an audio data field, where the clock field and the clock offset field indicate an audio data capturing time.

Based on the fifth aspect, in a possible implementation, before the respectively transmitting the first audio packet and the second audio packet to the audio device, the method further includes: The first communication connection with the audio device is established, and clock calibration with the audio device is performed over the first communication connection. The second communication connection with the audio device is established, and clock calibration with the audio device is performed over the second communication connection.

Based on the fifth aspect, in a possible implementation, the first wireless transceiver and the second wireless transceiver communicate with the audio device based on a short range communication technology.

The short range communication technology may include but are not limited to, a Bluetooth communication technology, a Wi-Fi communication technology, or the like.

According to a sixth aspect, this application provides an audio device communication method, where the communication method includes: A first audio packet is received from a first headset in a wireless headset over a first communication connection, and a second audio packet is received from a second headset in the wireless headset over a second communication connection. The first audio packet is decoded to obtain first audio data. The second audio packet is decoded to obtain second audio data. Audio data processing is performed on the first audio data and the second audio data, to generate third audio data and fourth audio data respectively. The first communication connection is different from the second communication connection.

Based on the sixth aspect, in a possible implementation, the communication method further includes: First indication information is transmitted to the first headset, and second indication information is transmitted to the second headset. The first indication information is for indicating a first communication period in which the first headset transmits the first audio packet in a communication cycle. The second indication information is for indicating a second communication period in which the second headset transmits the second audio packet in the communication cycle.

Based on the sixth aspect, in a possible implementation, the first communication period and the second communication period are time division periods in the communication cycle.

Based on the sixth aspect, in a possible implementation, the audio device includes a plurality of transceiver antennas. The first communication period and the second communication period are same time periods in the communication cycle.

Based on the sixth aspect, in a possible implementation, the first communication period includes at least one first communication sub-period and at least one second communication sub-period. The first communication sub-period is used to receive the first audio packet from the first headset, and the second communication sub-period is used to receive the first audio packet from the first headset when the first audio packet is unsuccessfully received.

Based on the sixth aspect, in a possible implementation, the second communication period includes at least one third communication sub-period and at least one fourth communication sub-period. The third communication sub-period is used to receive the second audio packet from the second headset, and the fourth communication sub-period is used to re-receive the second audio packet from the second headset when the second audio packet is unsuccessfully received.

Based on the sixth aspect, in a possible implementation, the communication method further includes: The third audio data and third indication information are encoded to generate a third audio packet, where the third indication information is for indicating a first start time at which the first headset performs playing based on the third audio data. The fourth audio data and fourth indication information are encoded to generate a fourth audio packet, where the fourth indication information is for indicating a second start time at which the second headset playings based on the fourth audio data.

Based on the sixth aspect, in a possible implementation, the communication method further includes: The third audio packet is transmitted to the first headset over the first communication connection. The fourth audio packet is transmitted to the second headset over the second communication connection.

Based on the sixth aspect, in a possible implementation, the decoding the first audio packet to obtain first audio data; the decoding the second audio packet to obtain second audio data; and the performing audio data processing on the first audio data and the second audio data to generate third audio data and fourth audio data respectively includes: The first audio packet is decoded to obtain fifth indication information. The second audio packet is decoded to obtain sixth indication information. Based on the fifth indication information and the sixth indication information, synchronous audio data processing is performed on the first audio data and the second audio data that are captured at a same time, to generate the third audio data and the fourth audio data.

Based on the sixth aspect, in a possible implementation, the audio data processing includes at least one of: noise reduction, amplification, pitch conversion, or stereo synthesis.

Based on the sixth aspect, in a possible implementation, the encoding the third audio data and third indication information to generate a third audio packet, and the encoding the fourth audio data and fourth indication information to generate a fourth audio packet includes: The third audio data and the third indication information are encoded based on a frame format in a communication protocol, to generate the third audio packet. The fourth audio data and the fourth indication information are encoded to generate the fourth audio packet. The frame format includes a clock field, a clock offset field, an audio packet length field, and an audio data field, where the clock field and the clock offset field indicate a time at which the audio data starts to be played.

Based on the sixth aspect, in a possible implementation, the communication method further includes: Before receiving the first audio packet from the first headset, the first communication connection with the first headset is established, and clock calibration with the first headset is performed over the first communication connection. Before receiving the second audio packet from the second headset, the second communication connection with the second headset is established, and clock calibration with the second headset is performed over the second communication connection.

Based on the sixth aspect, in a possible implementation, the audio device communicates with the first headset and the second headset based on a short range communication technology.

It should be understood that, the technical solutions in the second aspect to the sixth aspect of this application are consistent with the technical solution in the first aspect. Beneficial effects achieved in the various aspects and corresponding feasible implementations are similar, and details are not described again.

DETAILED DESCRIPTION OF ILLUSTRATIVE EMBODIMENTS

The following clearly and describes the technical solutions in embodiments of this application with reference to the accompanying drawings in embodiments of this application. It is clear that the described embodiments are merely some rather than all of the embodiments of this application. All other embodiments obtained by a person of ordinary skill in the art based on embodiments of this application without creative efforts shall fall within the protection scope of this application.

"First" or "second" and similar terms referred herein do not indicate any order, quantity or significance, but are merely used to distinguish between different components. Similarly, "one", "a", and similar terms also do not indicate a quantity limitation, but indicates that there is at least one. "Coupled" and similar terms are not limited to a direct physical or mechanical connection, but may include an electrical connection, regardless of a direct or indirect connection, equivalent to a connection in a broad sense.

The term "exemplary" or "for example" in embodiments of this application means used as an example, an illustration, or a description. Any embodiment or design scheme described as an "exemplary" or "for example" in embodiments of this application should not be explained as being more preferred or having more advantages than another embodiment or design scheme. Exactly, use of the word "example", "for example", or the like is intended to present a related concept in a specific manner. In the description of embodiments of this application, unless otherwise stated, "a plurality of" means two or more. For example, a plurality of headset apparatuses means two or more headset apparatuses.

Figure 1A:
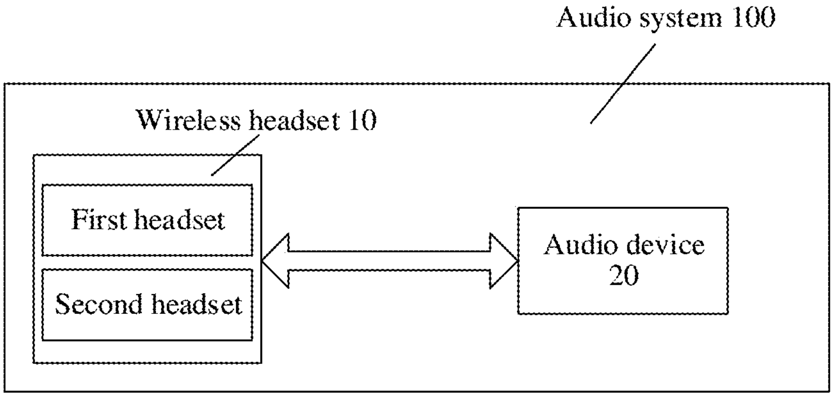
FIG. 1*a* is a structure of a schematic diagram of an audio system according to an embodiment of this application.
Figure 2A:
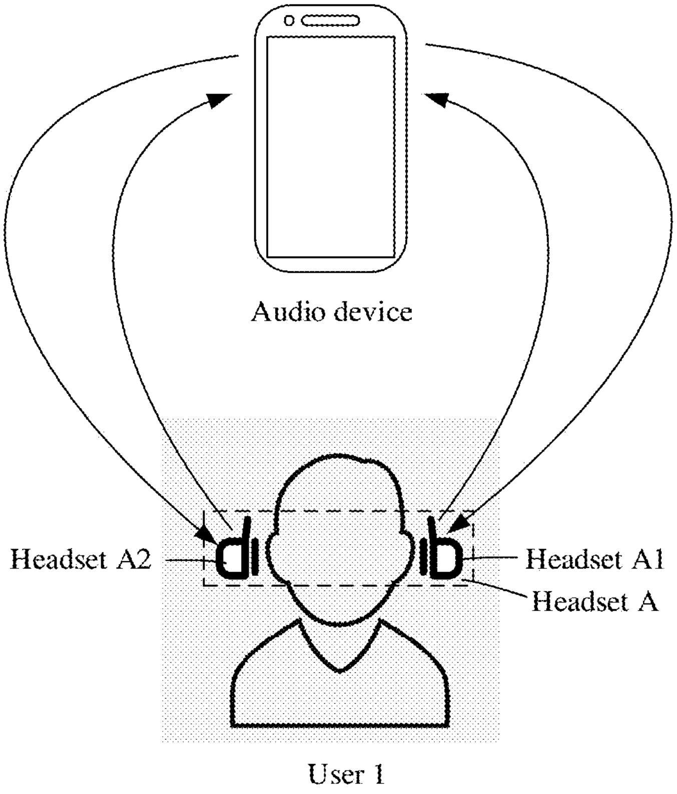
FIG. 2*a* to FIG. 2C are schematic diagrams of application scenarios according to an embodiment of this application.
Figure 2B:
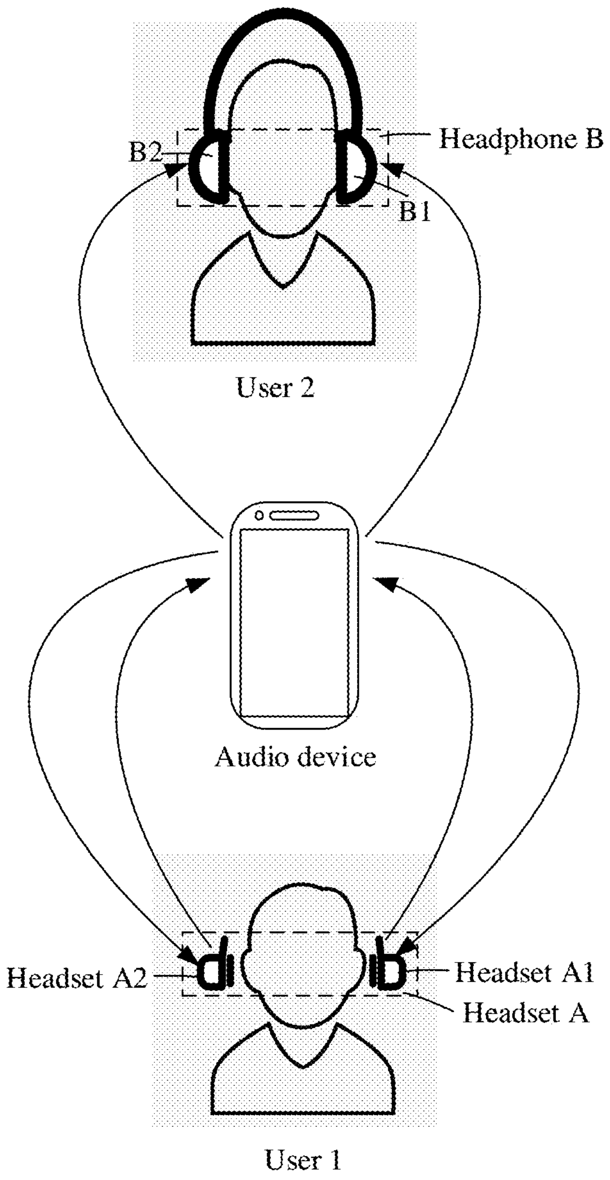

Refer to FIG. 1*a*. FIG. 1*a* is a structure of a schematic diagram of an audio system 100 according to an embodiment of this application. In FIG. 1*a*, the audio system 100 includes a wireless headset 10 and an audio device 20. The wireless headset 10 in this embodiment of this application is a headset device worn by a user on ears or near ears. The wireless headset 10 may communicate with the audio device 20 in various wireless short range transmission scenarios such as Bluetooth or Wi-Fi. The wireless headset may include but is not limited to wireless headsets in various forms, such as a true wireless stereo (True Wireless Stereo, TWS) headset. Based on a manner of wearing, the wireless headset 10 may include an in-ear headset, a headphone, and the like. Generally, the wireless headset 10 includes a first headset and a second headset. The first headset and the second headset may be independent headsets that are separated from each other, such as a headset A1 and a headset A2 in a wireless in-ear headset A shown in FIG. 2*a*. Alternatively, the first headset and the second headset may be disposed together through a head cover, such as a headphone B1 and a headphone B2 in a headphone B shown in FIG. 2*b*. It should be noted that, FIG. 2*a* and FIG. 2*b* schematically show a case in which the first headset is a left headset and the second headset is a right headset. In another application scenario, the first headset may also be a right headset, and the second headset may also be a left headset.

The wireless headset 10 shown in this embodiment of this application may further have a function of audio data capturing.

Figure 1B:
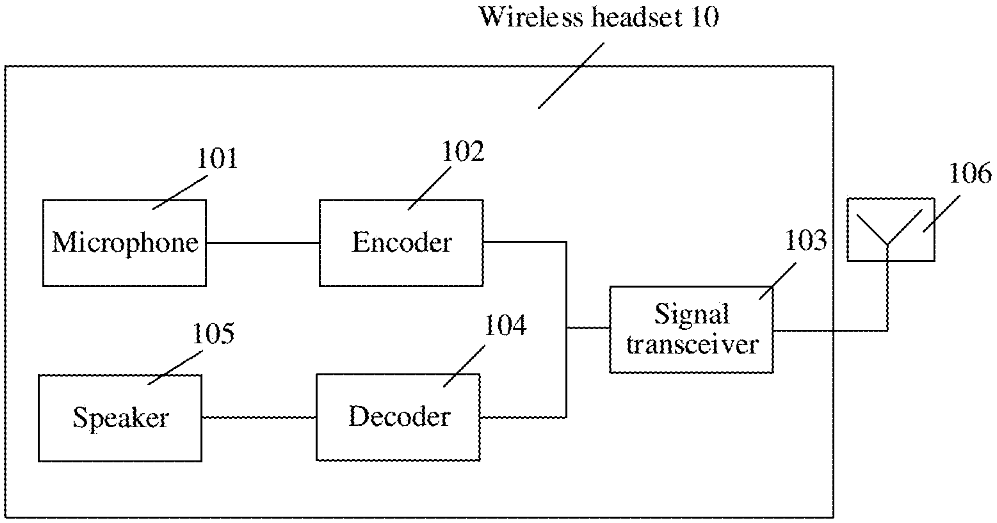
FIG. 1B is a schematic diagram of a hardware structure of a wireless headset according to an embodiment of this application.

Refer to FIG. 1B. FIG. 1B is a schematic diagram of a hardware structure of a first headset in the wireless headset 10. A schematic diagram of a hardware structure of a second headset in the wireless headset 10 may also be illustrated in FIG. 1B. The following describes in detail a hardware structure of the wireless headset 10 shown in FIG. 1B using a first headset as an example. The first headset includes a microphone 101, an encoder 102, and a wireless transceiver 103, where the encoder 102 is respectively coupled to the microphone 101 and the wireless transceiver 103. The microphone 101 is configured to capture audio data of a corresponding channel. The encoder 102 is configured to encode the audio data captured by the microphone 101, to generate an audio packet. The wireless transceiver 103 is configured to establish a connection with an audio device 20, and transmit an audio packet to the audio device 20 over the connection. In addition, in a possible implementation, the first headset may further include a decoder 104 and a speaker 105, as shown in FIG. 1B. The wireless transceiver 103 may further receive the audio packet from the audio device 20 based on the connection established between the wireless transceiver and the audio device 20, and provide the received audio packet to the decoder 104. After decoding the audio packet, the decoder 104 obtains audio data. The speaker 105 performs audio playing based on the audio data decoded by the decoder 104. In addition, the first headset shown in FIG. 1B may further include a necessary device such as an antenna 106, and details are not described herein again.

In this embodiment of this application, the first headset and the second headset may respectively obtain audio data, and respectively communicate with the audio device over an air interface independently. Each independent first headset and second headset may be provided with a headset apparatus. The headset apparatus may include an integrated circuit, a chip or a chipset, or a circuit board on which a chip or a chipset is mounted. The encoder 102, the decoder 104, and the wireless transceiver 103 shown in FIG. 1B may be integrated into the headset apparatus. However, it can be understood that the first headset and the second headset are paired in a design, production, and sale process.

Figure 2C:
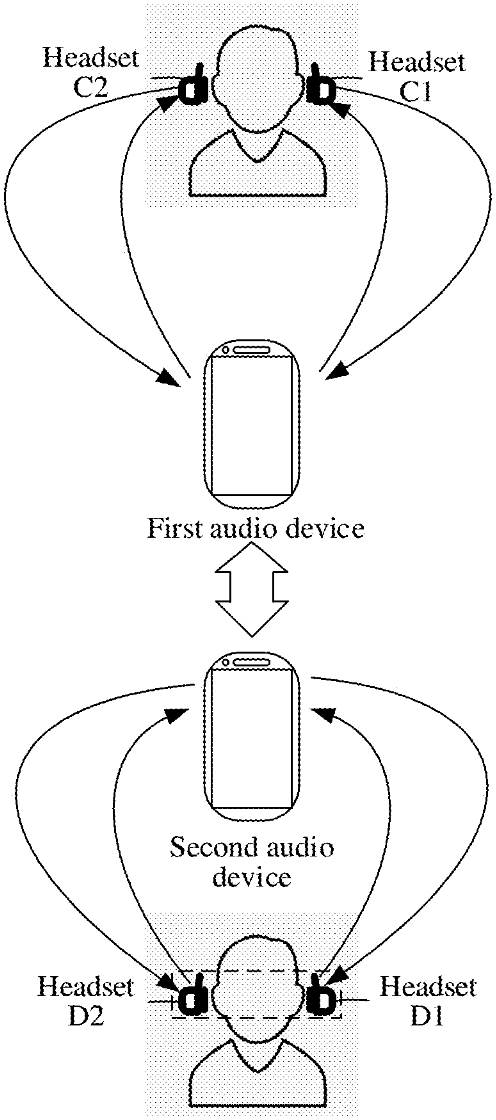
Figure 2D:
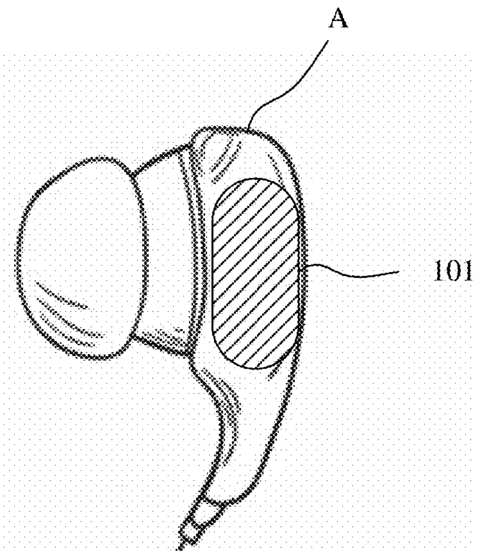
FIG. 2*d* to FIG. 2*e* are schematic diagrams of a wireless headset integrated with a microphone according to an embodiment of this application.
Figure 2E:
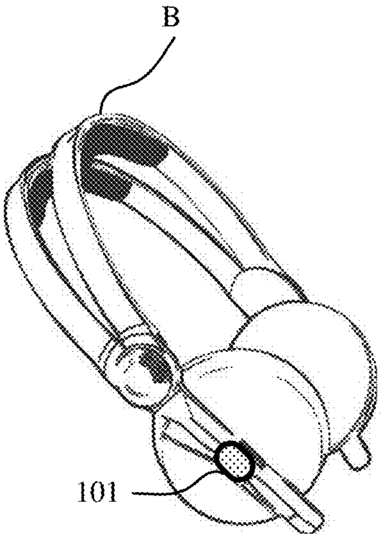

In an actual application, a microphone may be integrated outside the first headset and the second headset in the wireless headset 10 away from the ear, as shown in FIG. 2*d* to FIG. 2*e*. FIG. 2*d* schematically illustrates a case in which a microphone 101 is integrated outside one headset of the wireless in-ear headset 10. Another microphone 101 may be symmetrically integrated outside the other headset, which is not shown. FIG. 2*e* schematically illustrates a case in which a microphone 101 is integrated outside one of headsets of a headphone B. Another microphone may be symmetrically integrated outside the other headset of the headphone B, which is not shown.

Figure 1C:
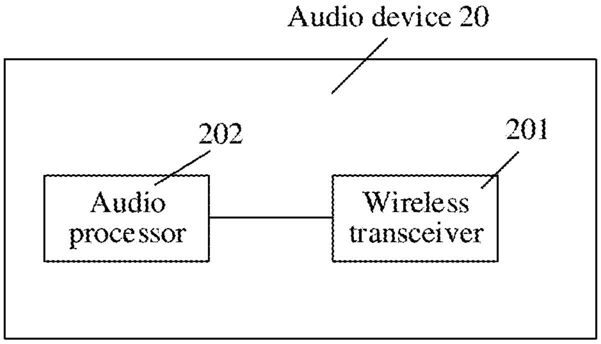
FIG. 1*c* is a schematic diagram of a hardware structure of an audio device according to an embodiment of this application.

In this embodiment of this application, the audio device 20 may alternatively be a chip or a chipset, a circuit board on which a chip or a chipset is mounted, or an electronic device including the circuit board. The electronic device may include but is not limited to, a mobile phone, a tablet computer, a wearable device, an in-vehicle device, a smart TV, a notebook computer, an ultra-mobile personal computer (ultra-mobile personal computer, UMPC), a netbook, a personal digital assistant (personal digital assistant, PDA), and the like. A specific type of the electronic device is not limited in this embodiment of this application. A hardware structure of the audio device 20 is shown in FIG. 1*c*. In FIG. 1*c*, the audio device 20 includes a wireless transceiver 201 and an audio processor 202. A wireless transceiver 201 is configured to establish a first communication connection with a first headset in a wireless headset 10, and establish a second communication connection with a second headset in the wireless headset 10. The wireless transceiver 201 receives a first audio packet from the first headset over the first communication connection, and receives a second audio packet from the second headset over the second communication connection. The audio processor 202 is configured to decode the first audio packet to obtain first audio data, decode the second audio packet to obtain second audio data, and perform audio data processing on the first audio data and the second audio data to generate third audio data and fourth audio data respectively. In addition, the audio processor 202 may further encode the third audio data to generate a third audio packet, and encode the fourth audio data to generate a fourth audio packet. The wireless transceiver 201 may further transmit the third audio packet to the first headset over the first communication connection, and transmit the fourth audio packet to the second headset over the second communication connection. The audio data processing may include but is not limited to, noise reduction, amplification, pitch conversion, or stereo synthesis. It should be noted that, the audio device shown in FIG. is may further include necessary devices such as a memory, a transceiver antenna, and a communication interface, which are not shown in FIG. 1*c*.

Refer to FIG. 2*a* to FIG. 2C. FIG. 2*a* to FIG. 2C are schematic diagrams of application scenarios of an audio system according to an embodiment of this application. In FIG. 2*a*, a user 1 wears a headset A1 and a headset A2, and obtains left-channel audio data and right-channel audio data respectively through a microphone disposed on the headset A1 and a microphone disposed on the headset A2. Then, the headset A1 encodes the left-channel audio data to generate a first audio packet, and provides the first audio packet to an audio device based on a first communication connection with the audio device. The headset A2 encodes the right-channel audio data to generate a second audio packet, and also provides the second audio packet to the audio device based on a second communication connection with the audio device. After decoding the first audio packet and the second audio packet, the audio device obtains left-channel audio data and right-channel audio data, and then respectively performs audio data processing on the left-channel audio data and the right-channel audio data. The audio device encodes the processed left-channel audio data to generate a third audio packet, and transmits the third audio packet to the headset A1 over the first communication connection. The audio device encodes the processed right-channel audio data to generate a fourth audio packet, and transmits the fourth audio packet to the headset A2 over the second communication connection. Therefore, the headset A1 decodes the third audio packet and plays the third audio packet decoded, and the headset A2 decodes the fourth audio packet and plays the fourth audio packet decoded.

The scenario shown in FIG. 2*a* is that the audio device interacts with the headset A1 and the headset A2 worn by the same user 1. The audio device may further interact with a plurality of wireless headsets worn by a plurality of users. Refer to FIG. 2*b* for details. In FIG. 2*b*, in a headset A worn by a user 1, left-channel audio data and right-channel audio data are obtained respectively through a microphone disposed on a headset A1 and a microphone disposed on a headset A2. The headset A1 encodes the obtained left-channel audio data to generate a first audio packet, and transmits the first audio packet to an audio device over a first communication connection. The headset A2 encodes the obtained right-channel audio data to generate a second audio packet, and transmits the second audio packet to the audio device over a second communication connection. The audio device respectively performs audio data processing on the left-channel audio data and the right-channel audio data, encodes the processed left-channel audio data to generate a third audio packet, and encodes the processed right-channel audio data to generate a fourth audio packet. Then, the third audio packet and the fourth audio packet are respectively transmitted to a headphone B1 and a headphone B2 in a headphone B worn by a user 2 over a third communication connection and a fourth communication connection respectively. Therefore, the headphone B1 performs audio playing after decoding the third audio packet, and the headphone B2 performs audio playing after decoding the fourth audio packet. In addition, in the scenario shown in FIG. 2*b*, the audio device may further transmit the third audio packet to the headset A1 over the first communication connection, and transmit the fourth audio packet to the headset A2 over the second communication connection. Therefore, the headset A may also play audio in the third audio packet and the fourth audio packet. Further, in the headphone B, left-channel audio data and right-channel audio data can also be obtained respectively through a microphone disposed on a headphone B1 and a microphone disposed on a headphone B2. The headphone B1 encodes the obtained left-channel audio data to generate a fifth audio packet. The headphone B2 encodes the obtained right-channel audio data to generate a sixth audio packet. The headphone B1 transmits the fifth audio packet to the audio device over the third communication connection. The headphone B2 transmits the sixth audio packet to the audio device over the fourth communication connection. The audio device generates a seventh audio packet and an eighth audio packet after decoding and processing the fifth audio packet and the sixth audio packet. Then the audio device transmits the seventh audio packet to the headset A1 over the first communication connection, transmits the eighth audio packet to the headset A2 over the second communication connection, transmits the seventh audio packet to the headphone B1 over the third communication connection, and transmits the eighth audio packet to the headphone B2 over the fourth communication connection.

The application scenario shown in FIG. 2*a* may specifically include a local audio recording scenario such as a singing scenario or a video recording scenario. Taking a singing scenario as an example, the user 1 may encode audio data of a song sung, and transmit the encoded audio data to the audio device respectively through the headset A1 and the headset A2. The audio device performs processing such as noise reduction, sound amplification, and pitch conversion on the audio data, and then encodes the audio data, and transmits the encoded data to the headset A1 and the headset A2. Therefore, the user 1 can hear the song sung by the user.

In the application scenario shown in FIG. 2*b*, the headset A1, the headset A2, the headphone B1, the headphone B2, and the audio device may communicate with each other via a short range communication technology. For example, the headset A1, the headset A2, the headphone B1, the headphone B2, and the audio device may access a same Wi-Fi network, so that the headset A1, the headset A2, the headphone B1, and the headphone B2 can all communicate with the audio device. Alternatively, the headset A1, the headset A2, the headphone B1, and the headphone B2 all communicate with the audio device via Bluetooth. In this case, the application scenario shown in FIG. 2*b* may specifically include an audio recording scenario such as the singing scenario or the video recording scenario. In an example of the singing scenario, the user 1 may encode audio data of a song sung, and transmit the encoded audio data to the audio device respectively through the headset A1 and the headset A2. The audio device performs processing such as noise reduction, sound amplification, and pitch conversion on the audio data, and then encodes the audio data, and transmits the encoded data to headset A1, the headset A2, the headphone B1, and the headphone B2. Therefore, both the user 1 and the user 2 can hear the song sung by the user 1. Similarly, the user 2 may encode audio data of a song sung, and transmit the encoded audio data to the audio device respectively through the headphone B1 and the headphone B2. The audio device performs processing such as noise reduction, sound amplification, and pitch conversion on the audio data, and then encodes the audio data, and transmits the encoded data to headset A1, the headset A2, the headphone B1, and the headphone B2. Therefore, both the user 1 and the user 2 can hear the song sung by the user 2.

In addition, in another scenario, a headset C1 and a headset C2 may communicate with a first audio device via a short range communication technology, a headset D1 and a headset D2 may communicate with a second audio device via the short range communication technology, and the first audio device and the second audio device may communicate with each other via instant messaging technologies, as shown in FIG. 2*c*. In this case, the headset C1 and the headset C2 may communicate with the first audio device in the communication manner in the application scenario shown in FIG. 2*a*. Similarly, the headset D1 and the headset D2 may communicate with the second audio device in the communication manner in the application scenario shown in FIG. 2*a*. The scenario may specifically include a local audio recording scenario such as a singing scenario or a video recording scenario, and may further include an online audio and video playing scenario such as a voice call scenario, a video call scenario, or a live broadcast scenario. In this case, the first audio device processes the audio data transmitted by the headset C1 and the headset C2, and then forwards the processed audio data to the second audio device. The second audio device then forwards the audio data transmitted by the first audio device to the headset D1 and the headset D2. Similarly, the second audio device processes the audio data transmitted by the headset D1 and the headset D2, and then forwards the processed audio data to the first audio device. The first audio device then forwards the audio data transmitted by the second audio device to the headset C1 and the headset C2. In this way, online audio and video playing scenario is implemented. Based on this scenario, further, the first audio device processes the audio data transmitted by the headset C1 and the headset C2 and then stores the processed audio data locally. For some applications running in the first audio device, when the applications support playing the transmitted audio and the user clicks to play the audio, the first audio device may further transmit the processed audio data to the headset C1 and the headset C2, so that a user 3 can hear the audio transmitted by the user.

The first headset and the second headset in the wireless headset described in this embodiment of this application may respectively establish a connection with the audio device, and may respectively perform a data transmission with the audio device independently. Therefore, the first headset and the second headset in the wireless headset are decoupled. Data captured by one of the headset does not need to be transmitted to the audio device through the other headset. In this way, power consumption of two headsets in the wireless headset is balanced. In addition, both of the two headsets in the wireless headset can encode audio data and transmit the encoded audio data to the audio device. Therefore, compared with using one headset to communicate with the audio device, a transmission amount of audio data in a transmission cycle can be increased, thereby reducing a compression amount of audio data, and improving audio quality. Further, one of headsets does not need to transmit the obtained audio data to the other headset. Therefore, for a real-time audio processing scenario, a delay of data transmission between the headset and the audio device can be reduced, which helps improve user experience.

Based on the scenario shown in FIG. 2*a*, in a possible implementation of this embodiment of this application, the first audio packet generated by the headset A1 after encoding the left-channel audio data may further include first indication information indicating a left-channel audio data capturing time. The second audio packet generated by the headset A2 after encoding the right-channel audio data may further include second indication information indicating a right-channel audio data capturing time. Similarly, the third audio packet generated by the audio data after encoding the processed left-channel audio data may further include third indication information indicating a start time of audio playing. The fourth audio packet generated by the audio data after encoding the processed right-channel audio data may further include fourth indication information indicating the start time of audio playing.

Because communication between the first headset and the audio device and communication between the second headset and the audio device are independent of each other, neither the first headset nor the second headset can learn of various information of each other, for example, information about a time at which the audio data is captured, information about a time at which the audio data starts to be played, or the like. Therefore, the audio device performs, based on the first indication information and the second indication information, synchronous audio data processing on the left-channel audio data and the right-channel audio data that are captured at the same time. In this way, audio data processing effect being reduced for some left-channel audio data and right-channel audio data that are captured at the same time due to processed differently (for example, treble processing needs to be performed simultaneously on the left-channel audio data and the right-channel audio data that are captured at the same time. Because the capturing time of the left-channel audio data and the right-channel audio data is not synchronized, the audio device performs treble processing on the left-channel audio data while performing bass processing on the right-channel audio data that are captured at the same time) can be avoided, so that audio data processing effect is improved. In addition, the third indication information and the fourth indication information are set, so that the first headset and the second headset can perform synchronous audio playing, thereby improving audio playing effect.

In this embodiment of this application, the first headset and the second headset in the wireless headset 10 communicate with the audio device 20 based on a short range communication protocol. The following uses a Bluetooth protocol-based transmission scenario as an example to describe a communication method between a wireless headset 10 and an audio device 20 provided in an embodiment of this application.

In this embodiment of this application, both a first headset and a second headset in the wireless headset 10 shown in FIG. 1 may communicate with the audio device 20 with a frame format shown in Table 1. That is, an encoder in the first headset and an encoder in the second headset may respectively encode audio data with the frame format shown in Table 1, to generate an audio packet, and then transmit the generated audio packet to the audio device. In Table 1, the frame format includes the following fields: a packet header field, a packet length field, a Bluetooth (BT) clock (BT Clock) field, a clock offset field, and an audio data field. Data carried in the Packet Header field indicates synchronization information of transmitting and receiving of the audio packet, information about which layer of the Bluetooth protocol being along to, and information indicating a running terminal application (for example, a telephone application, a music playing application, or a karaoke application). Data carried in the Packet Length field is used to indicate a length of the entire audio packet, facilitating parsing of the audio packet by the audio device. Bluetooth clock may also be referred to as Bluetooth standard clock. Data carried in the BT Clock field is used to indicate a start time of audio data captured by the headset. The start time may be a coarse-grained clock signal, and a precision of the time may be, for example, 312.5 μs. Data carried in the Clock offset field is used to indicate an offset of a time when the headset captures audio data relative to the start time of the Bluetooth clock. A time recorded in the data carried in the Clock offset field may be fine-grained time, and a precision of the time may be, for example, 1 μs. The Audio Data field is used to carry captured audio data. That is, when the encoder in the first headset and the encoder in the second headset respectively encode the audio data with the frame format shown in Table 1, data carried in the BT Clock field and the Clock offset field jointly indicate the capturing time of the audio data.

In addition, in this embodiment of this application, the audio device 20 shown in FIG. 1 may also respectively communicate with the first headset and the second headset in the wireless headset 10 with the frame format shown in Table 1. That is, an audio processor in the audio device respectively encodes different audio data with the frame format shown in FIG. 1, to generate different audio packets. The wireless transceiver then respectively transmits the different audio packets to the first headset and the second headset. It should be noted that, when the audio processor in the audio device 20 encodes the audio data with the frame format shown in Table 1, meanings indicated by the data carried in the BT Clock field and the Clock offset field are different from that indicated when the wireless headset encodes the captured audio data. In particular, the data carried in the BT Clock field is used to indicate a start time at which the first headset or the second headset starts to play audio, where the start time is a coarse-grained clock signal, and a precision of the time may be, for example, 312.5 μs. The data carried in the Clock offset field is used to indicate an offset of a time when the first headset or the second headset plays the audio data relative to the start time of the Bluetooth clock. A time recorded in the data carried in the Clock offset field may be fine-grained time, and a precision of the time may be, for example, 1 μs. That is, when the audio encoder in the audio device encodes the audio data with the frame format shown in Table 1, the data carried in the BT Clock field and the Clock offset field jointly indicate the time at which the audio starts to be played.

TABLE 1

| Packet Header | Packet Length | BT Clock | Clock offset | Audio Data |
|---|---|---|---|---|

In a possible implementation of this embodiment of this application, before the headset A1 shown in FIG. 2*a* transmits the first audio packet to the audio device, the first wireless transceiver in the headset A1 is further configured to perform Bluetooth clock calibration with the audio device via the first communication connection. Similarly, before the headset A2 shown in FIG. 2*a* transmits the second audio packet to the audio device, the second wireless transceiver in the headset A2 is further configured to perform Bluetooth clock calibration with the audio device via the second communication connection.

Time calibration performed between the first wireless transceiver and the second wireless transceiver with the audio device help improve accuracy of time synchronization between the first wireless transceiver and the second wireless transceiver with the audio device. Therefore, the audio device can more accurately determine first audio data and second audio data that are captured at a same time. In this way, accuracy of performing audio data processing on audio data by the audio device is improved. In addition, the first headset and the second headset may further determine playing time of the third audio data and the fourth audio data more accurately, which helps improve sound quality effect of audio playing.

Figure 3:
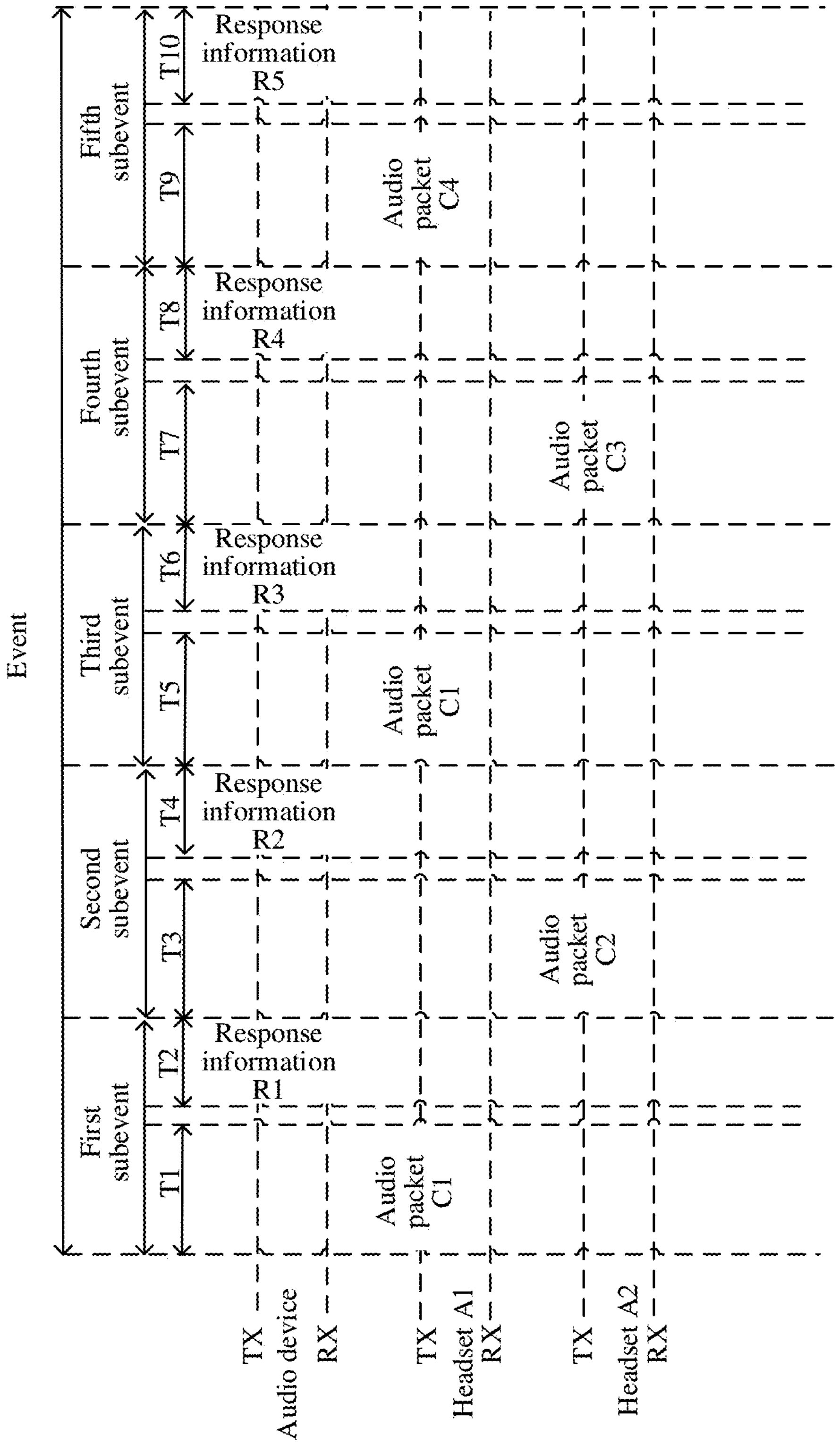
FIG. 3 is an interaction time sequence diagram of data transmission between a wireless headset and a mobile phone according to an embodiment of this application.

Based on the schematic diagram of a structure of the audio system 100 shown in FIG. 1*a*, the hardware structure of the wireless headset shown in FIG. 1B, and the hardware structure of the audio device shown in FIG. 1*c*, and using the scenario shown in FIG. 2*a* as an example, the communication method between the wireless headset and the audio device shown in the embodiments of this application is described in detail. Refer to FIG. 3. FIG. 3 is a communication interaction time sequence diagram between a wireless headset and an audio device.

In FIG. 3, the audio device, a headset A1, and a headset A2 respectively occupy two time lines. In the two time lines, one time line TX represents a transmit time line, and the other time line RX represents a receive time line. In addition, each time line may be divided into a complete event (Event) and subevents (Subevent) based on steps of an audio data transmission process. One subevent means that one of the headsets transmits an audio packet to the audio device, and the audio device transmits, to a corresponding wireless headset, indication information indicating whether the audio packet is successfully received. For example, the headset A1 is used as an example. One subevent means that the headset A1 transmits an audio packet C1 to the audio device, and the audio device returns, to the headset A1, response information R1 indicating whether the audio packet C1 is successfully received. Because one subevent cannot ensure that the audio device successfully receives the audio data transmitted by the wireless headset, and because an amount of data that can be transmitted by the wireless headset at a time is limited, one subevent cannot ensure that the wireless headset can transmit all audio data that needs to be processed to the audio device. Alternatively, a phenomenon of packet loss occurs during audio packet transmission. Furthermore, one or more subevents may occur after one subevent, until the audio device successfully receives audio data transmitted by each wireless headset, or until a cycle agreed between each wireless headset and the audio device is completed. Therefore, from the time when the headset A1 transmits the audio packet C1, to the time when the audio device successfully receives all audio packets from the headset A1 and the headset A2, may be referred to as a complete event. In addition, in some cases, from the time when the headset A1 transmits the audio packet C1, to the time when the cycle agreed between each wireless headset and the audio device is completed, a headset may not successfully receive audio data. In this case, from the time when the headset A1 transmits the audio packet C1, to the time when the cycle agreed between each wireless headset and the audio device is completed, may also be referred to as a complete event. It should be noted that, one complete event may also be referred to as a communication cycle. One communication cycle includes a plurality of communication periods. One subevent may include a communication period in which the headset transmits an audio packet to the audio device and a communication period in which the audio device feeds back whether the audio packet is successfully received. For example, in FIG. 3, a complete event (or referred to as a communication cycle) includes a first subevent, a second subevent, a third subevent, a fourth subevent, and a fifth subevent. The first subevent is completed within a communication period T1 and a communication period T2. The second subevent is completed within a communication period T3 and a communication period T4. The third subevent is completed within a communication period T5 and a communication period T6. The fourth subevent is completed within a communication period T7 and a communication period T8. The fifth subevent is completed within a communication period T9 and a communication period Tw. In addition, it should be noted that, when the headset A1 establishes the first communication connection with the audio device, the audio device further transmits indication information to the headset A1. The indication information indicates the communication period T1, the communication period T5, and the communication period T9 in which the headset A1 transmits an audio packet to the audio device. Similarly, when the headset A2 establishes the second communication connection with the audio device, the audio device further transmits indication information to the headset A2. The indication information indicates the communication period T3 and the communication period T7 in which the headset A2 transmits an audio packet to the audio device. It can be learned from FIG. 3 that the communication period in which the headset A1 transmits the audio packet to the audio device and the communication period in which the headset A2 transmits the audio packet to the audio device are time division periods in one communication cycle. That is, the headset A1 and the headset A2 alternately transmit audio packets to the audio device in the communication cycle. In the communication interaction time sequence shown in FIG. 3, the audio device respectively receives audio packets from the headset A1 and the headset A2 in different time periods via one antenna.

Figure 4:
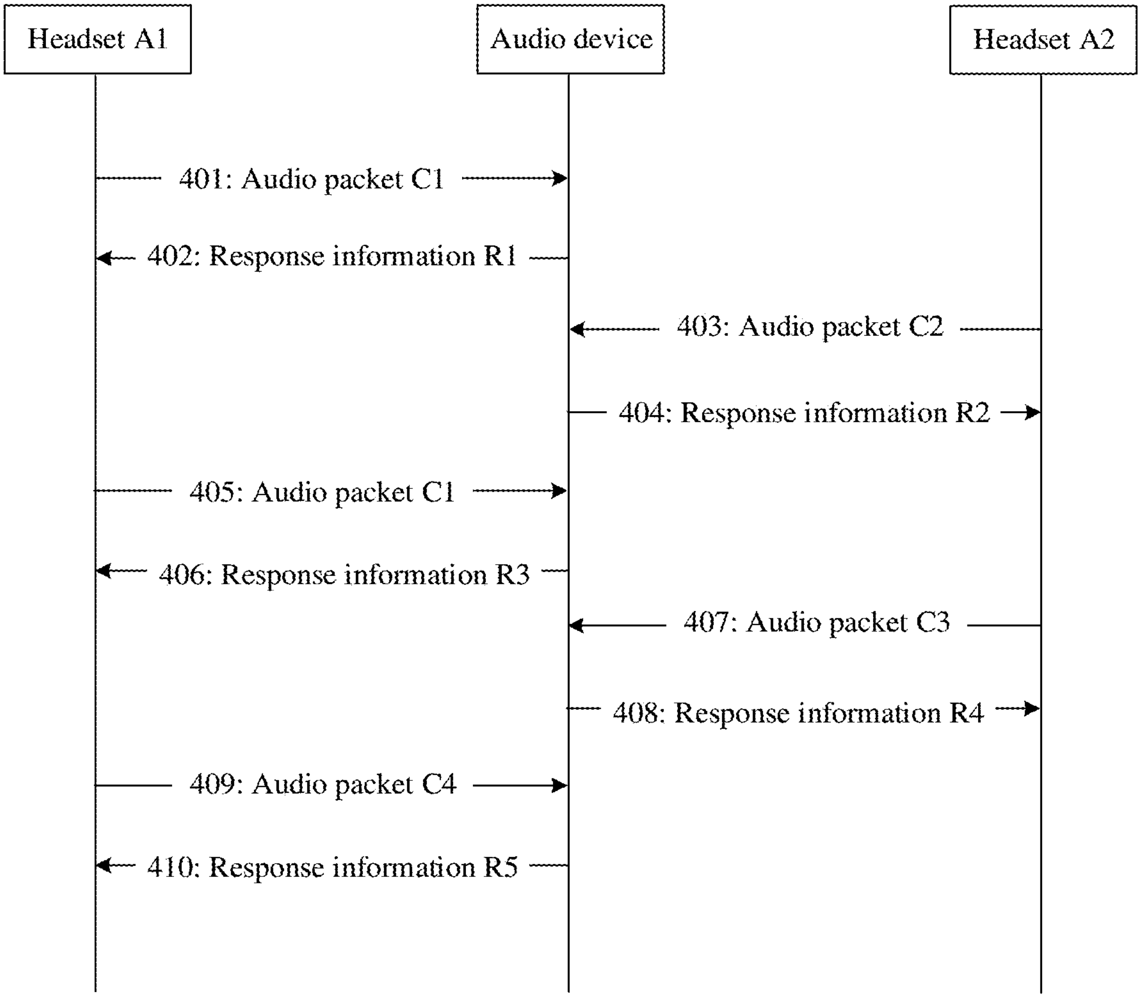
FIG. 4 is a flowchart of data transmission between a wireless headset and a mobile phone according to an embodiment of this application.

Based on the communication interaction time sequence shown in FIG. 3, using the case in which the headset A1 needs two subevents to transmit all left-channel audio data to the audio device, and the headset A2 needs two subevents to transmit all right-channel audio data to the audio device as an example, the communication interaction between the wireless headsets and the audio device is described in detail with reference to FIG. 4. Refer to FIG. 4. FIG. 4 is a communication interaction process 400 between a wireless headset and an audio device. The communication interaction process 400 specifically includes the following steps.

Step 401: A headset A1 transmits an audio packet C1 to an audio device.

In this embodiment, after the headset A1 establishes a first communication connection with the audio device by using a Bluetooth protocol, the headset A1 may encode a first left-channel audio data with a frame format shown in Table 1 to generate the audio packet C1, and transmit the audio packet C1 to the audio device in a communication period T1 shown in FIG. 3.

After transmitting the audio packet C1 to the audio device, the headset A1 may wait for response information from the audio device. The response information indicates whether the audio device successfully receives the audio packet C1.

Step 402: The audio device transmits response information R1 to the headset A1, where the response information R1 indicates that the audio packet C1 is not successfully received.

In this embodiment, after receiving the audio packet C1 from the headset A1, the audio device may decode the audio packet C1, to determine whether the audio packet C1 is successfully received. In particular, the audio device may determine, based on a packet length in a frame format shown in Table 1, whether data is lost. When data is lost, it indicates that the audio packet C1 is not successfully received. In addition, in some other scenarios, the audio device does not receive the audio packet C1 from the headset A1 at the appointed time, which also indicates that the audio packet C1 is not successfully received. After determining that the audio packet C1 is not successfully received, the audio device transmits the foregoing response information R1 to the headset A1 in a communication period T2 shown in FIG. 3.

Step 403: A headset A2 transmits an audio packet C2 to the audio device.

In this embodiment, after the headset A2 establishes a second communication connection with the audio device by using the Bluetooth protocol, the headset A2 may encode a first right-channel audio data with the frame format shown in Table 1 to generate the audio packet C2, and transmit the audio packet C2 to the audio device in a communication period T3 shown in FIG. 3.

After transmitting the audio packet C2 to the audio device, the headset A2 may wait for response information from the audio device. The response information indicates whether the audio device successfully receives the audio packet C2.

Step 404: The audio device transmits response information R2 to the headset A2, where the response information R2 indicates that the audio packet C2 is successfully received.

In this embodiment, after receiving the audio packet C2 from the headset A2, the audio device may decode the audio packet C2, to determine whether the audio packet C2 is successfully received. In particular, the audio device may determine, based on the packet length in the frame format shown in Table 1, whether data is lost. When data is not lost, it indicates that the audio packet C2 is successfully received. After determining that the audio packet C2 is successfully received, the audio device transmits the foregoing response information R2 to the headset A2 in a communication period T4 shown in FIG. 3.

Step 405: The headset A1 retransmits the audio packet C1 to the audio device based on the response information R1.

In this embodiment, when the headset A1 receives the response information R1, it indicates that the audio packet C1 is not successfully received by the audio device. It is needed to retransmit the audio packet C1 to the audio device in a communication period T5 shown in FIG. 3.

Step 406: The audio device transmits response information R3 to the headset A1, where the response information R3 indicates that the audio packet C1 is successfully received.

In this embodiment, the audio device may transmit the response information R3 to the headset A1 in a communication period T6 shown in FIG. 3.

Step 407: The headset A2 transmits an audio packet C3 to the audio device.

In this embodiment, the headset A2 may encode a second right-channel audio data with the frame format shown in Table 1 to generate the audio packet C3, and transmit the audio packet C3 to the audio device in a communication period T7 shown in FIG. 3. After transmitting the audio packet C3 to the audio device, the headset A2 may wait for response information from the audio device. The response information indicates whether the audio device successfully receives the audio packet C3.

Step 408: The audio device transmits response information R4 to the headset A2, where the response information R4 indicates that the audio packet C3 is successfully received.

In this embodiment, the audio device may transmit the response information R4 to the headset A2 in a communication period T8 shown in FIG. 3.

Step 409: The headset A1 transmits an audio packet C4 to the audio device.

In this embodiment, the headset A1 may encode a second left-channel audio data with the frame format shown in Table 1 to generate the audio packet C4, and transmit the audio packet C4 to the audio device in a communication period T9 shown in FIG. 3. After transmitting the audio packet C4 to the audio device, the headset A1 may wait for response information from the audio device. The response information indicates whether the audio device successfully receives the audio packet C4.

Step 410: The audio device transmits response information R5 to the headset A1, where the response information R5 indicates that the audio packet C4 is successfully received.

In this embodiment, the audio device may transmit the response information R5 to the headset A1 in a communication period T10 shown in FIG. 3.

It should be understood that the communication interaction step between the wireless headset and the audio device shown in FIG. 4 is merely an example. In this embodiment of this application, another operation or a variation of each operation in FIG. 4 may be further performed. This embodiment of this application may further include more or fewer steps than those shown in FIG. 4. For example, when the headset A1 may complete transmission of all left-channel audio data in one subevent, and the headset A2 may complete transmission of all right-channel audio data in one subevent, step 407 to step 410 may not need to be provided. In addition, when the response information R2 transmitted by the audio device to the headset A2 indicates that the audio packet C2 is unsuccessfully received, step 407 shown in FIG. 4 needs to be replaced with that the headset A2 retransmits the second audio packet to the audio device.

It can be seen from step 401 to step 410 shown in FIG. 4 that, in the time sequence shown in FIG. 3, the headset A1 and the headset A2 alternately transmit audio packets to the audio device respectively through subevents. That is, the headset A1 transmits the audio packet C1 to the audio device in a first subevent, the headset A2 transmits the audio packet C2 to the audio device in a second subevent, the headset A1 retransmits the audio packet C1 to the audio device in a third subevent, the headset A2 transmits the audio packet C3 to the audio device in a fourth subevent, and the headset A1 transmit the audio packet C4 to the audio device in a fifth subevent. In addition, the headset A1 and the headset A2 are set to be closely connected at a time point of data transmission. In this way, continuity of data transmission in time domain can be ensured, to save air interface resources. In addition, a delay of data received from each headset can be reduced. For a real-time audio processing scenario, performance of real-time audio playing can be improved.

In the embodiments of communication interaction shown in FIG. 3 and FIG. 4, an event that the wireless headset establishing the communication connection with the audio device and transmitting the audio packet is triggered by the wireless headset. In other words, when the headset A1 establishes the first communication connection with the audio device and transmits the audio packet, the headset A1 needs to initiate a connection request to the audio device, and actively transmits the audio packet to the audio device based on an agreed time after the first communication connection is established. Similarly, when the headset A2 establishes the second connection with the audio device and transmits the audio packet, the headset A2 needs to initiate a connection request to the audio device, and actively transmits the audio packet to the audio device based on an agreed time after the second connection is established.

Figure 5:
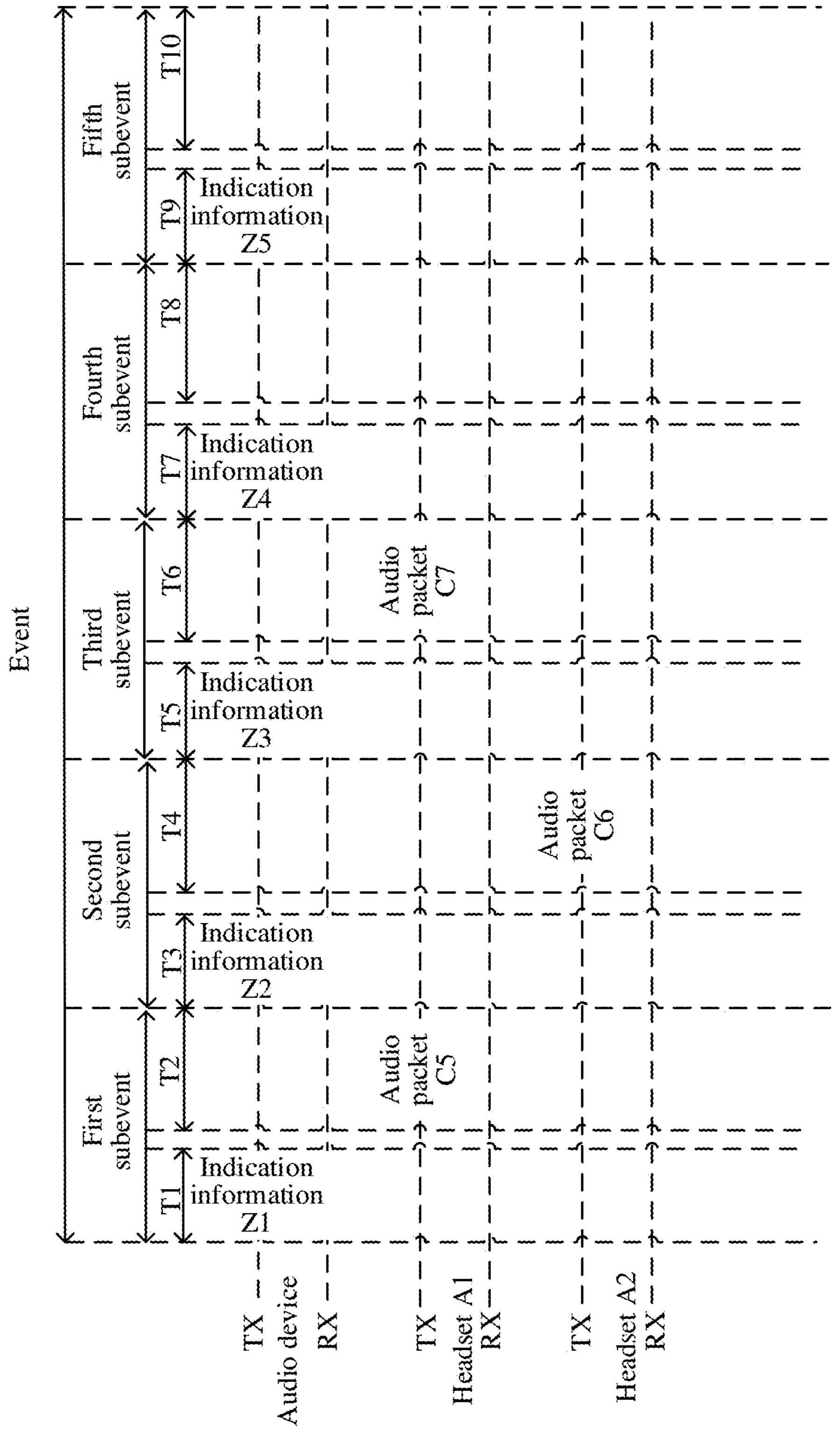
FIG. 5 is another interaction time sequence diagram of data transmission between a wireless headset and a mobile phone according to an embodiment of this application.
Figure 6:
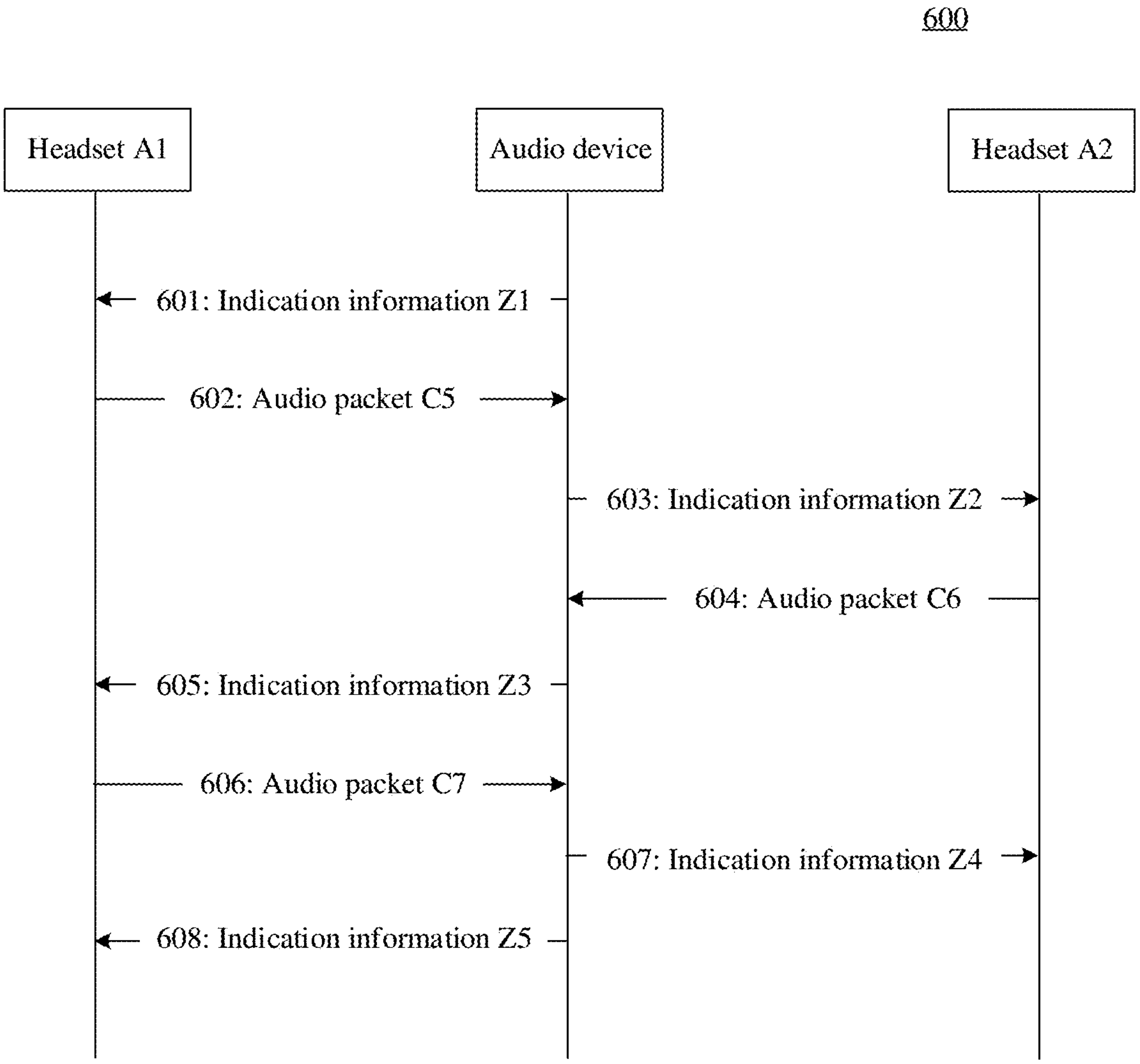
FIG. 6 is another flowchart of data transmission between a wireless headset and a mobile phone according to an embodiment of this application.

In a possible implementation, an event that the wireless headset establishing the communication connection with the audio device and transmitting the audio packet may alternatively be triggered by the audio device. In this implementation, the audio device respectively initiates a connection request to the headset A1 and the headset A2, to respectively establish the communication connection with the headset A1 and the headset A2. After establishing the first communication connection with the headset A1, the audio device may transmit indication information to the headset A1, to indicate the headset A1 to transmit the audio packet. Similarly, after establishing the connection with the headset A2, the audio device may transmit indication information to the headset A2, to indicate the headset A2 to transmit the audio packet. In addition, the indication information transmitted by the audio device may further include whether an audio packet previously transmitted by the headset A1 or the headset A2 is successfully received, and whether the headset A1 or the headset A2 continues to transmit an audio packet. In this implementation, an interaction time sequence between the audio device and the wireless headset is shown in FIG. 5. Similar to the interaction time sequence shown in FIG. 3, the audio device, a headset A1, and a headset A2 respectively occupy two time lines. In the two time lines, one time line TX represents a transmit time line, and the other time line RX represents a receive time line. In addition, each time line may be divided into a complete event (Event) and subevents (Subevent) based on steps of an audio data transmission process. Meanings represented by the subevents and the complete event are the same as that shown in FIG. 3, and details are not described herein again. One complete event may also be referred to as a communication cycle. A communication cycle may include a plurality of communication periods. A relationship between each subevent and a communication period shown in FIG. 5 is the same as that in the embodiment shown in FIG. 3. For details, refer to related descriptions in the embodiment shown in FIG. 3. Details are not described herein again. Based on the interaction time sequence shown in FIG. 5, using the case in which the headset A1 needs two subevents to transmit all left-channel audio data to the audio device, and the headset A2 needs one subevent to transmit all right-channel audio data to the audio device as an example. Continue to refer to FIG. 6. FIG. 6 is an interaction process 600 between a wireless headset and an audio device. The interaction process 600 specifically includes:

Step 601: An audio device transmits indication information Z1 to a headset A1, where the indication information Z1 indicates the headset A1 to transmit an audio packet C5 to the audio device.

In this embodiment, after the audio device establishes a first communication connection with the headset A1 by using a Bluetooth protocol, the audio device may transmit the indication information Z1 to the headset A1 in a communication period T1 shown in FIG. 5, to trigger the headset A1 to transmit the audio packet to the audio device.

Step 602: The headset A1 transmits the audio packet C5 to the audio device based on the indication information Z1.

In this embodiment, the headset A1 may encode a first left-channel audio data with a frame format shown in Table 1 to generate the audio packet C5, and transmit the audio packet C5 to the audio device in a communication period T2 shown in FIG. 5.

Step 603: The audio device transmits indication information Z2 to a headset A2, where the indication information Z2 indicates the headset A2 to transmit an audio packet C6 to the audio device.

In this embodiment, after the audio device establishes a second communication connection with the headset A2 by using the Bluetooth protocol, the audio device may transmit the indication information Z2 to the headset A2 in a communication period T3 shown in FIG. 5, to trigger the headset A2 to transmit an audio packet C6 to the audio device.

Step 604: The headset A2 transmits the audio packet C6 to the audio device based on the indication information Z2.

In this embodiment, the headset A2 may encode a first right-channel audio data with the frame format shown in Table 1 to generate the audio packet C6, and transmit the audio packet C6 to the audio device in a communication period T4 shown in FIG. 5.

Step 605: The audio device transmits indication information Z3 to the headset A1, where the indication information Z3 indicates that the audio packet C5 is successfully received and indicates the headset A1 to continue transmitting the audio packet.

In this embodiment, after the audio device successfully receives the audio packet C5, the audio device may transmit the indication information Z3 to the headset A1 in a communication period T5 shown in FIG. 5.

Step 606: The headset A1 transmits an audio packet C7 to the audio device based on the indication information Z3.

In this embodiment, the headset A1 determines, based on the indication information Z3, whether to continue transmitting the audio packet to the audio device. The indication information Z3 indicates that the audio packet C5 is successfully received, and indicates the headset A1 to continue transmitting the audio packet to the audio device. In this case, the headset A1 may encode a second left-channel audio data with the frame format shown in Table 1 to generate an audio packet C7, and transmit the audio packet C7 to the audio device in a communication period T6 shown in FIG. 5.

Step 607: The audio device transmits indication information Z4 to the headset A2, where the indication information Z4 indicates that the audio packet C6 is successfully received, and indicates the headset A2 to stop transmitting the audio packet.

In this embodiment, after successfully receiving the audio packet C6, the audio device may transmit the indication information Z4 to the headset A2 in a communication period T7 shown in FIG. 5.

After receiving the indication information Z4 from the audio device, the headset A2 determines, based on the indication information Z4, whether to continue transmitting the audio packet to the audio device. The indication information Z4 indicates that the audio packet C6 is successfully received, and indicate that the headset A2 does not need to continue transmitting the audio packet to the audio device. In this case, the headset A2 may stop transmitting the audio packet.

Step 608: The audio device transmits indication information Z5 to the headset A1, where the indication information Z5 indicates that the audio packet C7 is successfully received and indicates the headset A1 to stop transmitting the audio packet.

In a specific implementation, after successfully receiving the audio packet C7, the audio device may transmit the indication information Z5 to the headset A1 in a communication period T9 shown in FIG. 5.

In this embodiment, after receiving the indication information Z5 from the audio device, the headset A1 may determine whether to continue transmitting the audio packet to the audio device. The indication information Z5 indicates that the audio packet C7 is successfully received, and indicates the headset A1 to stop transmitting the audio packet to the audio device. In this case, the headset A1 may stop transmitting the audio packet.

It should be understood that the communication interaction step between the wireless headset and the audio device shown in FIG. 6 is merely an example. In this embodiment of this application, another operation or a variation of each operation in FIG. 6 may be further performed. This embodiment of this application may further include more or fewer steps than those shown in FIG. 6.

FIG. 3 to FIG. 6 schematically illustrate the communication interaction time sequence and the communication interaction step in which the wireless headset transmits the audio packet to the audio device.

In this embodiment of this application, after receiving the audio packet including the left-channel audio data and the audio packet including the right-channel audio data from the headset A1 and the headset A2, the audio device may decode the audio packets, to obtain the left-channel audio data and the right-channel audio data. Then, audio data processing is performed on the left-channel audio data and the right-channel audio data. In particular, the audio device may perform, based on the Bluetooth clock information and the clock offset information in each audio packet, synchronous audio data processing on the left-channel audio data and the right-channel audio data that are captured at the same time. For example, data combination is performed on the left-channel audio data and the right-channel audio data that are captured at the same time. Then, processing such as noise elimination and tone adjustment is performed on the combined audio data, and left channel and right channel separation is performed on the processed audio data. Finally, the separated left-channel audio data and right-channel audio data are respectively encoded and transmitted to the headset A1 and the headset A2 shown in FIG. 2*a*, so that the user 1 can play the processed audio through the headset A1 and the headset A2 (or transmitted to the headphone B1 and the headphone B2 shown in FIG. 2*b*, so that the user 2 can play the processed audio through the headphone B1 and the headphone B2). In another possible implementation, the audio device may alternatively do not need to perform data combination on the left-channel audio data and the right-channel audio data. Based only on the Bluetooth clock information and the clock offset information in each audio packet, synchronous audio data processing is respectively performed on the left-channel audio data and the right-channel audio data. Then the processed left-channel audio data and the processed right-channel audio data are respectively encoded and transmitted to the headset A1 and the headset A2.

Figure 7:
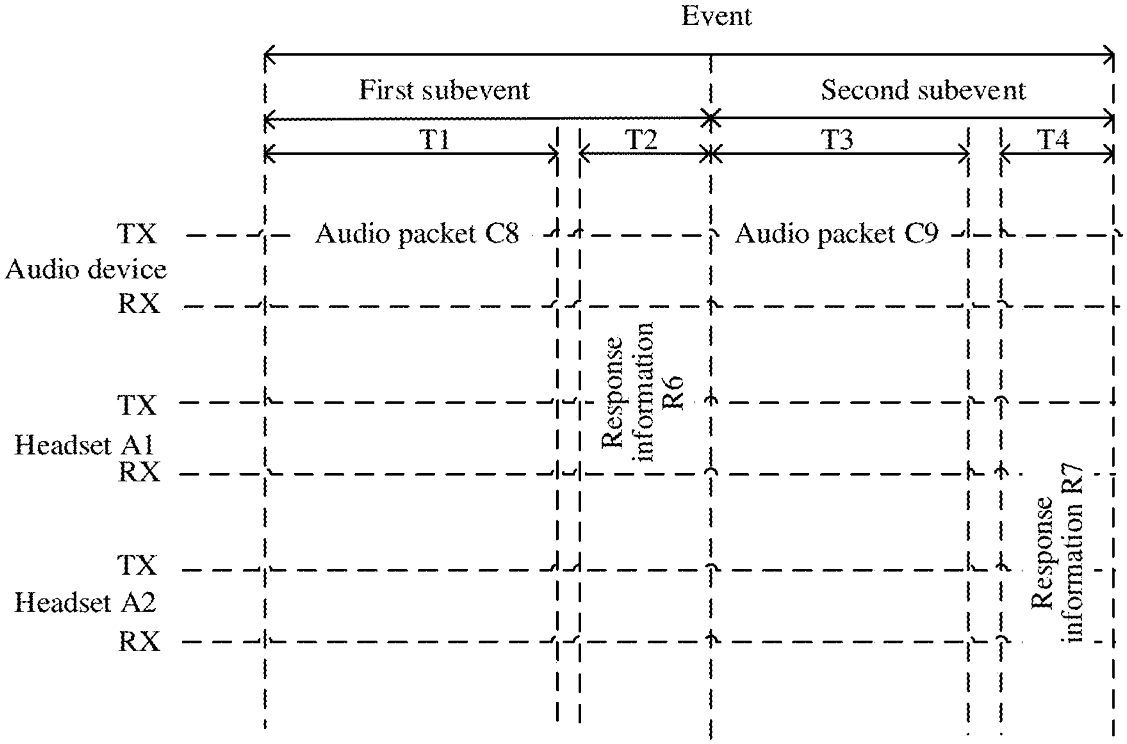
FIG. 7 is still another interaction time sequence diagram of data transmission between a wireless headset and a mobile phone according to an embodiment of this application.

Based on the scenario shown in FIG. 2*a*, the following describes a method for transmitting an audio packet by an audio device to a headset A1 and a headset A2. Continue to refer to FIG. 7. FIG. 7 is a communication interaction time sequence of transmitting an audio packet to a headset A1 and a headset A2 by an audio device according to an embodiment of this application.

In FIG. 7, the audio device, a headset A1, and a headset A2 respectively occupy two time lines. In the two time lines, one time line TX represents a transmit time line, and the other time line RX represents a receive time line. In addition, each time line may be divided into a complete event (Event) and subevents (Subevent) based on steps of an audio data transmission process. One subevent means that the audio device transmits an audio packet to one of the headsets, and the headset transmits, to the audio device, indication information indicating whether the audio packet is successfully received. Because one subevent cannot ensure that each wireless headset successfully receives the audio packet transmitted by the audio device, and because an amount of data that can be transmitted by the audio device at a time is limited, one subevent cannot ensure that the audio device can complete transmission of all audio data. Alternatively, a phenomenon of packet loss occurs during audio packet transmission. Furthermore, one or more subevents may occur after one subevent, until each wireless headset successfully receives audio data transmitted by the audio device, or until a cycle agreed between each wireless headset and the audio device is completed. Therefore, from the time when the audio device starts to transmit an audio packet to one of the wireless headsets, to the time when all the wireless headsets successfully receive the audio data that needs to be played, may be referred to as a complete event. In addition, from the time when the audio device starts to transmit the audio packet to one of the headsets, to the time when the cycle agreed between each wireless headset and the audio device is completed, a headset may not successfully receive audio data. In this case, from the time when the audio device starts to transmit the audio packet to one of the headsets, until the time when the cycle agreed between each wireless headset and the audio device is completed, may also be referred to as a complete event. One complete event may also be referred to as a communication cycle. One communication cycle includes a plurality of communication periods. One subevent may include a communication period in which the audio device transmits an audio packet to the headset and a communication period in which the headset feeds back whether the audio packet is successfully received. For example, in FIG. 3, a complete event (or referred to as a communication cycle) includes a first subevent and a second subevent. The first subevent is completed within a communication period T1 and a communication period T2, and the second subevent is completed within a communication period T3 and a communication period T4. In the communication interaction time sequence shown in FIG. 7, the audio device respectively transmits the audio packet to the headset A1 and the headset A2 in different time periods via one antenna.

Figure 8:
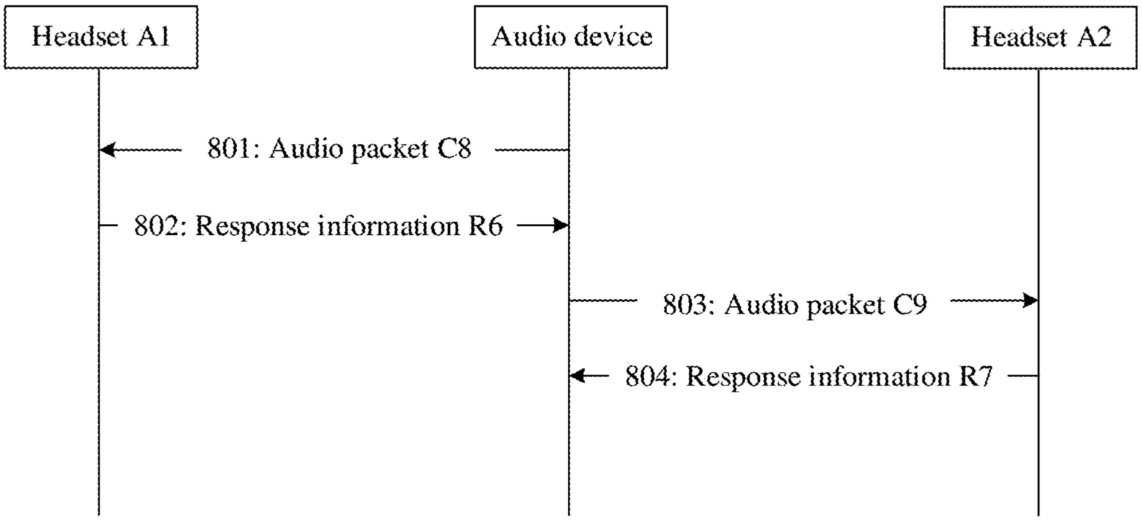
FIG. 8 is still another flowchart of data transmission between a wireless headset and a mobile phone according to an embodiment of this application.

Based on the time sequence shown in FIG. 7, continue to refer to FIG. 8. FIG. 8 is an interaction process 800 between a wireless headset and an audio device. The interaction process 800 specifically includes:

Step 801: The audio device transmits an audio packet C8 to a headset A1.

In this embodiment, the audio device may encode the processed left-channel audio data with a frame structure shown in Table 1 to generate the audio packet C8, and then transmit the audio packet C8 to the headset A1 in a communication period T1 shown in FIG. 7.

Step 802: The headset A1 transmits response information R6 to the audio device, where the response information R6 indicates that the audio packet C8 is successfully received.

In this embodiment, the headset A1 may transmit the response information R6 to the audio device in a communication period T2 shown in FIG. 7.

Step 803: The audio device transmits an audio packet C9 to a headset A2.

In this embodiment, the audio device may encode the processed right-channel audio data with the frame structure shown in Table 1 to generate the audio packet C9, and then transmit the audio packet C9 to the headset A2 in a communication period T3 shown in FIG. 7.

Step 804: The headset A2 transmits response information R7 to the audio device, where the response information R7 indicates that the audio packet C9 is successfully received.

In this embodiment, the headset A2 may transmit the response information R7 to the audio device in a communication period T4 shown in FIG. 7.

It should be understood that the communication interaction step between the wireless headset device and the audio device shown in FIG. 8 is merely an example. In this embodiment of this application, another operation or a variation of each operation in FIG. 8 may be further performed. This embodiment of this application may further include more or fewer steps than those shown in FIG. 8.

Figure 9:
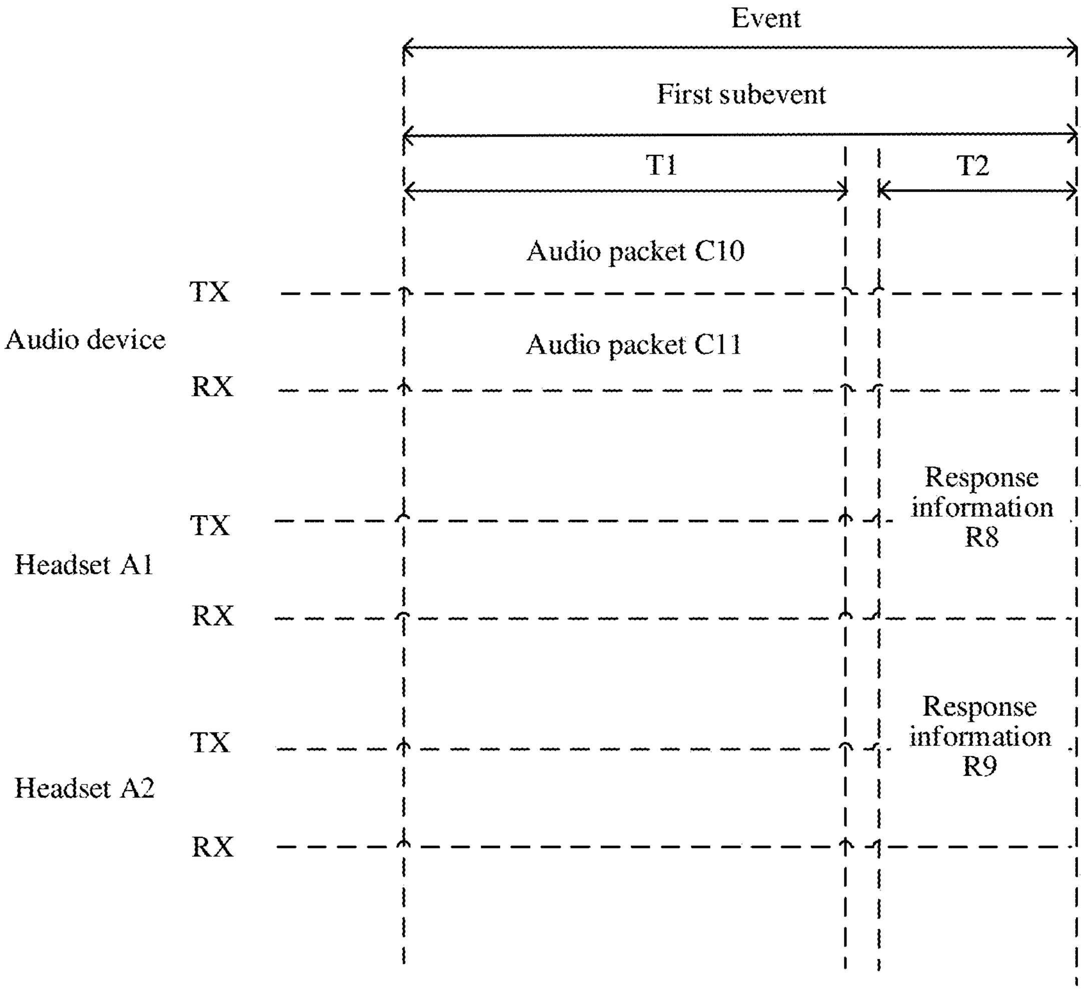
FIG. 9 is yet another interaction time sequence diagram of data transmission between a wireless headset and a mobile phone according to an embodiment of this application.

In the interaction time sequence between the audio device and the wireless headset shown in FIG. 3 to FIG. 8, the audio device interacts with the headset A1 and the headset A2 in the wireless headset via one transceiver antenna. In this implementation, when the audio device receives audio packets from a plurality of headsets, or when the audio device transmits audio packets to the plurality of headsets, the plurality of headsets need to occupy different communication periods. In this embodiment, the audio device may further respectively communicate with the plurality of headsets via a plurality of antennas. When the audio device is provided with the plurality of antennas, the audio device may respectively receive different audio packets from the plurality of headsets in a same communication period, or transmit different audio packets to the plurality of headsets in a same communication period. In this case, the plurality of headsets occupies different frequency bands in a same communication period. The scenario shown in FIG. 2*a* is used as an example. Continue to refer to FIG. 9. FIG. 9 is an interaction time sequence between an audio device and a wireless headset when the audio device respectively communicates with a headset A1 and a headset A2 via a plurality of antennas.

As shown in FIG. 9, the audio device, the headset A1, and the headset A2 respectively occupy two time lines. In the two time lines, one time line TX represents a transmit time line, and the other time line RX represents a receive time line. In addition, each time line may be divided into a complete event (Event) and subevents (Subevent) based on steps of an audio data transmission process. One complete event includes a plurality of subevents. In FIG. 9, one subevent means that the audio device simultaneously transmits different audio packets to the headset A1 and the headset A2, and the headset A1 and the headset A2 respectively transmit, to the audio device, indication information indicating whether the audio packet is successfully received.

In the communication interaction time sequence shown in FIG. 9, in a communication period T1, the audio device transmits an audio packet C10 to the headset A1 via a first antenna with a first frequency, where the audio packet C10 is generated after the processed left-channel audio data is encoded, and transmits an audio packet C11 to the headset A2 via a second antenna with a second frequency, where the audio packet C11 is generated after the processed right-channel audio data is encoded. The headset A1 and the headset A2 respectively transmit response information R8 and response information R9 to the audio device in a communication period T2. The audio device receives the response information R8 from the headset A1 via the first antenna, and receives the response information R9 from the headset A2 via the second antenna.

FIG. 7 to FIG. 9 schematically illustrate the communication interaction time sequence and the communication interaction step in which the audio device transmits the processed audio data to the wireless headset.

In this embodiment of this application, after the audio device respectively establishes the connection with the headset A1 and the headset A2, the audio device may perform interaction through a plurality of complete events. For example, the headset A1 and the headset A2 may respectively encode, based on the interaction time sequence of a complete event shown in FIG. 3 or FIG. 5, the left-channel audio data and the right-channel audio data, and transmit the encoded left-channel audio data and right-channel audio data to the audio device. The audio device processes the received audio data, and then respectively encodes, based on the interaction time sequence of a complete event shown in FIG. 7 or FIG. 9, the processed left-channel audio data and right-channel audio data, and transmits the processed left-channel audio data and right-channel audio data to the headset A1 and the headset A2. Therefore, the headset A1 and the headset A2 play audio based on the time at which the audio starts to be played and the received audio data that are indicated in the audio packet. Then, when performing audio playing based on the received audio data, the headset A1 and the headset A2 may further encode the captured audio data based on the interaction time sequence of a complete event shown in FIG. 3 or FIG. 5, and transmit the encoded audio data to the audio device. The process is repeated until the communication connection between the audio device and the headset A1 and the headset A2 is interrupted. Therefore, the purpose of real-time processing and playing the captured audio data is achieved. In addition, the audio devices and the wireless headset can perform data transmission and backhaul in a complete event. The communication interaction time sequence shown in FIG. 7 is used as an example. When transmitting, to the audio device in the communication period T2 in the first subevent shown in FIG. 7, indication information indicating whether the audio packet is successfully received, the headset A1 may further transmit the audio packet to the audio device. The audio packet is obtained after encoding the left-channel audio data captured in real time. When transmitting, to the audio device in the communication period T4 in the second subevent shown in FIG. 7, indication information indicating whether the audio packet is successfully received, the headset A2 may further transmit the audio packet to the audio device. The audio packet is obtained after encoding the right-channel audio data captured in real time. Based on this, the wireless headset may encode the audio data captured by the microphone in real time and transmit the encoded audio data to the audio device. The audio device may decode the audio packet received from the wireless headset to obtain the audio data, and process the audio data. Then, the processed audio data is encoded and returned to the wireless headset in time. Afterwards, the wireless headset may continue to encode the captured audio data and transmit the encoded audio data to the audio device. The audio device continues to decode the audio data received from the wireless headset, and returns the audio data to the wireless headset in time after performing audio processing. In this way, the audio data captured by the wireless headset is processed in real time, and the processed audio data is played in real time. When a user starts a voice chat application, a singing application, a video application, or a sound beautification application, the user may beautify, in real time according to a selection, an audio that the user wants to transmit to another user, or beautify a sound that the user sings. Therefore, a user experience is improved. It should be noted that, the manner of communication in the application scenario shown in FIG. 2*b* and FIG. 2*c* may be used to implement the chat application or the video application. The manner of communication in the application scenario shown in FIG. 2*a* and FIG. 2*b* may be used to implement the singing application, the video application, or the sound beautification application.

Figure 10:
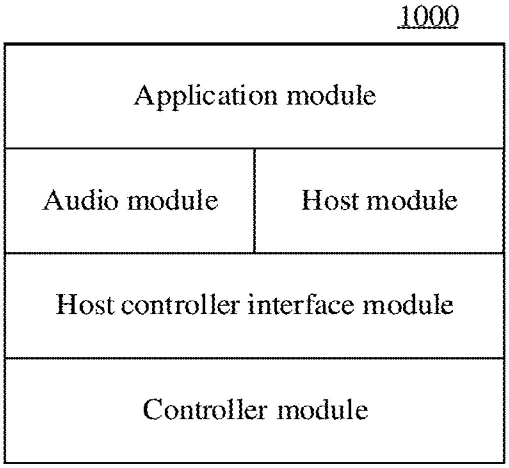
FIG. 10 is a schematic diagram of a structure of a headset apparatus according to an embodiment of this application.

Based on the embodiments shown in FIG. 3 to FIG. 9, continue to refer to FIG. 10. FIG. 10 is a schematic software structural diagram of a headset apparatus 100 for forming a wireless headset according to an embodiment of this application.

In FIG. 10, the headset apparatus 100 includes an application (Application) module, an audio (Audio) module, a host (Host) module, a host controller interface (Host Controller Interface, HCI) module, and a controller (Controller) module. The application module may control starting, suspending, and ending of services such as data transmission, and parameter configuration. In addition, the application module may further control the microphone to capture audio data or stop capturing audio data. The audio module may capture audio data through a microphone based on parameters such as a sampling frequency or a data compression rate provided by the application module, and perform primary encapsulation on the captured audio data. In addition, when capturing audio data, the audio module further needs to record local clock information during audio data capturing. Therefore, when performing stereo processing on the left-channel audio data and the right-channel audio data, the audio device performs synchronous audio processing on the left-channel audio data and the right-channel audio data that are captured at the same time. The audio module transmits the encapsulated audio data and recorded local clock information to the controller module through the HCI module. The host module controls the Bluetooth based on the parameter configuration delivered by the application module and the supporting capability transmitted by the controller module. In addition, the host module may further set, based on the parameter delivered by the application module, data carried in the Packet Header field of the frame structure shown in Table 1, for example, data indicating an application (for example, a telephone application, a recording application, or a music application) corresponding to the captured audio data. The set data carried in the Packet Header field is transmitted to the controller module through the HCI module. The HCI module is a standard communication interface between the Bluetooth upper-layer application and the bottom-layer transmission. Data exchange between the host module and the controller module, and between the audio module and the controller module can be performed through the HCI module. The controller module may obtain the Bluetooth clock BT Clock when the connection with the mobile phone is established. In addition, the controller module may further determine, based on the local clock information recorded by the audio module, a clock offset Offset of the start time of the BT Clock relative to the time at which the audio module completes audio data capturing. Then, the controller module performs, based on the audio data provided by the audio module and the packet header data provided by the host module, packet assembly with the frame structure shown in Table 1. Finally, the controller module may transmit, via a wireless transceiver and an antenna, the assembled data via an air interface at a time point agreed with the audio device.

It should be noted that, each software module in the headset apparatus 100 shown in FIG. 10 may drive running of hardware devices such as a microphone 101, an encoder 102, a wireless transceiver 103, a decoder 104, and a speaker 105 shown in FIG. 1*b*, to implement functions such as capturing audio data, communicating with audio devices, and playing audio.

In addition, the headset apparatus 100 may further include a memory. The encoder 102 or the decoder 104 may invoke all or some computer programs stored in the memory to control and manage an action of the headset apparatus 100, for example, to support the headset apparatus 100 in performing the steps performed by the foregoing modules. The memory may be configured to support the headset apparatus 100 to store program code, data, and the like. The encoder 102 or the decoder 104 may include a programmable logic device, a transistor logic device, a discrete hardware component, or the like.

This embodiment further provides a computer readable storage medium. The computer readable storage medium stores computer instructions. The computer instructions, when being run on a computer, enable the computer to perform the related method steps, to implement audio data capturing, communication with an audio device, and audio playing in the foregoing embodiment.

This embodiment further provides a computer program product. The computer program product, when being run on a computer, enable the computer to perform the related steps, to implement audio data capturing, communication with an audio device, and audio playing in the foregoing embodiment.

The computer storage medium or the computer program product provided in the embodiments are all configured to perform the foregoing corresponding methods. Therefore, for beneficial effects that can be achieved, refer to the beneficial effects in the foregoing corresponding methods. Details are not described herein again.

The foregoing descriptions about implementations allow a person skilled in the art to understand that, for the purpose of convenient and brief description, division of the foregoing function modules is taken as an example for illustration. During actual application, the foregoing functions can be allocated to different functional modules and implemented according to a requirement, that is, an inner structure of an apparatus is divided into different functional modules to implement all or some of the functions described above.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or a part that contributes to the prior art, or all or a part of the technical solutions may be embodied in a form of a software product. The software product is stored in a storage medium. Several instructions are included to enable a device (which may be a single-chip microcomputer, a chip, or the like) or a processor to perform all or some of the steps of the methods in embodiments of this application. The readable storage medium includes: any medium that can store program code, such as a USB flash drive, a removable hard disk, a read only memory (ROM), a random access memory (RAM), a magnetic disk, an optical disc, or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless headphone, comprising:

a first headset, comprising:

a first microphone, configured to obtain, through sound capturing, first audio data corresponding to a first channel;

a first encoder, configured to encode the first audio data to obtain a first audio packet; and a first wireless transceiver, configured to transmit the first audio packet to an audio device over a first communication connection; and a second headset, comprising:

a second microphone, configured to obtain, through voice capturing, second audio data corresponding to a second channel;

a second encoder, configured to encode the second audio data to obtain a second audio packet; and a second wireless transceiver, configured to transmit the second audio packet to the audio device over a second communication connection, wherein the first communication connection is different from the second communication connection, and the first channel and the second channel are used to implement stereo sound effect, wherein the first wireless transceiver is further configured to receive a third audio packet from the audio device, the third audio packet being generated from the first audio packet by the audio device performing audio data processing on the first audio data in the first audio packet, wherein the second wireless transceiver is further configured to receive a fourth audio packet from the audio device, the fourth audio packet being generated from the second audio packet by the audio device performing audio data processing on the second audio data in the second audio packet, and wherein:

the first encoder is configured to encode the first audio data based on a frame format in a communication protocol, to obtain the first audio packet, the second encoder is configured to encode the second audio data based on the frame format, to obtain the second audio packet, and the frame format comprises a clock field, a clock offset field, an audio packet length field, and an audio data field, and the clock field and the clock offset field indicate an audio data capturing time.

2. The wireless headphone according to claim 1, wherein the first wireless transceiver is further configured to:

receive first indication information from the audio device, and determine, based on the first indication information, a first communication period used by the first wireless transceiver to transmit the first audio packet in a communication cycle; and the second wireless transceiver is further configured to:

receive second indication information from the audio device, and determine, based on the second indication information, a second communication period used by the second wireless transceiver to transmit the second audio packet in the communication cycle.

3. The wireless headphone according to claim 2, wherein the first communication period and the second communication period are time division periods in the communication cycle; or the first communication period and the second communication period are same time periods in the communication cycle.

4. The wireless headphone according to claim 2, wherein the first communication period comprises at least one first communication sub-period and at least one second communication sub-period, wherein the at least one first communication sub-period is used to transmit the first audio packet to the audio device, and the at least one second communication sub-period is used to retransmit the first audio packet to the audio device when the first audio packet is unsuccessfully transmitted; and the second communication period comprises at least one third communication sub-period and at least one fourth communication sub-period, wherein the at least one third communication sub-period is used to transmit the second audio packet to the audio device, and the at least one fourth communication sub-period is used to retransmit the second audio packet to the audio device when the second audio packet is unsuccessfully transmitted.

5. The wireless headphone according to claim 1, wherein the first headset further comprises a first decoder and a first speaker, and the second headset further comprises a second decoder and a second speaker;

the first decoder is configured to decode the third audio packet to obtain third audio data;

the first speaker is configured to perform playing based on the third audio data;

the second decoder is configured to decode the fourth audio packet to obtain fourth audio data; and the second speaker is configured to perform playing based on the fourth audio data.

6. The wireless headphone according to claim 5, wherein the first decoder is further configured to: decode the third audio packet to obtain third indication information, determine a first start time based on the third indication information, and control the first speaker to perform playing at the first start time based on the third audio data; and the second decoder is further configured to: decode the fourth audio packet to obtain fourth indication information, determine a second start time based on the fourth indication information, and control the second speaker to perform playing at the second start time based on the fourth audio data.

7. The wireless headphone according to claim 5, wherein the first audio packet further comprises fifth indication information, and the second audio packet further comprises sixth indication information; and the fifth indication information and the sixth indication information indicate the audio device to perform synchronous audio data processing on the first audio data and the second audio data that are captured at a same time.

8. The wireless headphone according to claim 5, wherein the audio data processing comprises at least one of:

noise reduction, amplification, pitch conversion, or stereo synthesis.

9. The wireless headphone according to claim 1, wherein before transmitting the first audio packet to the audio device, the first wireless transceiver is further configured to establish the first communication connection with the audio device, and perform clock calibration with the audio device over the first communication connection; and before transmitting the second audio packet to the audio device, the second wireless transceiver is further configured to establish the second communication connection with the audio device, and perform clock calibration with the audio device over the second communication connection.

10. The wireless headphone according to claim 1, wherein the first wireless transceiver and the second wireless transceiver communicate with the audio device based on a short range communication technology.

11. A headset apparatus comprising:

an encoder, configured to obtain first audio data from a microphone, and encode the first audio data to obtain a first audio packet, wherein the first audio data is audio data corresponding to a first channel; and a wireless transceiver, coupled to the encoder, and configured to establish a first communication connection with an audio device and transmit the first audio packet to the audio device over the first communication connection, the audio device being configured to communicate over different communication connections, wherein the wireless transceiver is further configured to receive a second audio packet from the audio device, the second audio packet being generated from the first audio packet by the audio device performing audio data processing on the first audio data in the first audio packet, and wherein:

the encoder is configured to encode the first audio data based on a frame format in a communication protocol, to obtain the first audio packet, and the frame format comprises a clock field, a clock offset field, an audio packet length field, and an audio data field, and the clock field and the clock offset field indicate an audio data capturing time.

12. The headset apparatus according to claim 11, wherein the wireless transceiver is further configured to:

receive first indication information from the audio device, and determine, based on the first indication information, a communication period used by the wireless transceiver to transmit the first audio packet in a communication cycle.

13. The headset apparatus according to claim 12, wherein the communication period comprises at least one first communication sub-period and at least one second communication sub-period, wherein the at least one first communication sub-period is used to transmit the first audio packet to the audio device; and the at least one second communication sub-period is used to retransmit the first audio packet to the audio device when the first audio packet is unsuccessfully transmitted.

14. The headset apparatus according to claim 11, wherein the headset apparatus further comprises a decoder; and the decoder is configured to decode the second audio packet to obtain second audio data.

15. The headset apparatus according to claim 14, wherein the decoder is further configured to: decode the second audio packet to obtain second indication information, determine a start time based on the second indication information, and control a speaker to perform playing at the start time based on the second audio data.

16. The headset apparatus according to claim 11, wherein the wireless transceiver communicates with the audio device based on a short range communication technology.

17. A communication method for a wireless headset apparatus, the method comprising:

obtaining, through sound capturing, first audio data corresponding to a first channel and second audio data corresponding to a second channel;

encoding the first audio data and the second audio data respectively to generate a first audio packet and a second audio packet;

transmitting the first audio packet to an audio device over a first communication connection with the audio device;

transmitting the second audio packet to the audio device over a second communication connection with the audio device;

receiving a third audio packet from the audio device, the third audio packet being generated from the first audio packet by the audio device performing audio data processing on the first audio data in the first audio packet; and receiving a fourth audio packet from the audio device, the fourth audio packet being generated from the second audio packet by the audio device performing audio data processing on the second audio data in the second audio packet, wherein the first communication connection is different from the second communication connection, and the first channel and the second channel implement stereo sound effect, and wherein:

the first audio data and the second audio data are respectively encoded based on a frame format in a communication protocol, to obtain the first audio packet and the second audio packet, and the frame format comprises a clock field, a clock offset field, an audio packet length field, and an audio data field, and the clock field and the clock offset field indicate an audio data capturing time.

18. The communication method of claim 17, further comprising:

receiving first indication information from the audio device;

determining, based on the first indication information, a first communication period to transmit the first audio packet in a communication cycle;

receiving second indication information from the audio device; and determining, based on the second indication information, a second communication period to transmit the second audio packet in the communication cycle.

* * * * *